United States Patent

Ozu et al.

[11] Patent Number: 5,934,090
[45] Date of Patent: Aug. 10, 1999

[54] AIR CONDITIONING UNIT

[75] Inventors: Tsutomu Ozu, Kawaguchi; Kimio Mochizuki, Fuji; Shigetoshi Akiyama, Fuji; Hiroshi Ichikawa, Fuji; Senzo Shinohara, Fuji; Hiroaki Kashiwagi, Fuji, all of Japan

[73] Assignees: Tokyo Gas Co., Ltd., Tokyo; Takagi Industrial Co., Ltd., Shizuoka-ken, both of Japan

[21] Appl. No.: 09/040,165

[22] Filed: Mar. 17, 1998

[30] Foreign Application Priority Data

Dec. 26, 1997 [JP] Japan .................................. 9-360658

[51] Int. Cl.[6] .................................................. F25B 15/00
[52] U.S. Cl. ............................................ 62/141; 62/105
[58] Field of Search .............................. 62/101, 102, 141, 62/476, 105

[56] References Cited

U.S. PATENT DOCUMENTS

| 3,374,644 | 3/1968 | Foster | 62/141 |
| 3,626,711 | 12/1971 | Porter et al. | 62/476 |
| 4,312,476 | 1/1982 | Pohlmann | 237/2 B |
| 4,394,959 | 7/1983 | De Vries | 237/2 B |
| 4,526,009 | 7/1985 | Van Der Sluys et al. | 62/101 |
| 5,259,202 | 11/1993 | Nishiguchi et al. | 62/147 |

*Primary Examiner*—William Doerrler
*Attorney, Agent, or Firm*—Pollock, Vande Sande & Amernick

[57] ABSTRACT

An air conditioning unit is capable of preventing a liquid absorbent from crystallizing, thereby enhancing reliability of the operation thereof. A given amount of refrigerant is supplied to dilute the liquid absorbent when the air conditioning unit stops in operation, and it is circulated in lines and components of the air conditioning unit, thereby cleansing the liquid absorbent remaining in the components or lines, and the liquid absorbent is returned to the liquid tank, so that the liquid absorbent is prevented from crystallizing, whereby reliability of the operation is enhanced.

10 Claims, 17 Drawing Sheets

F I G. 17
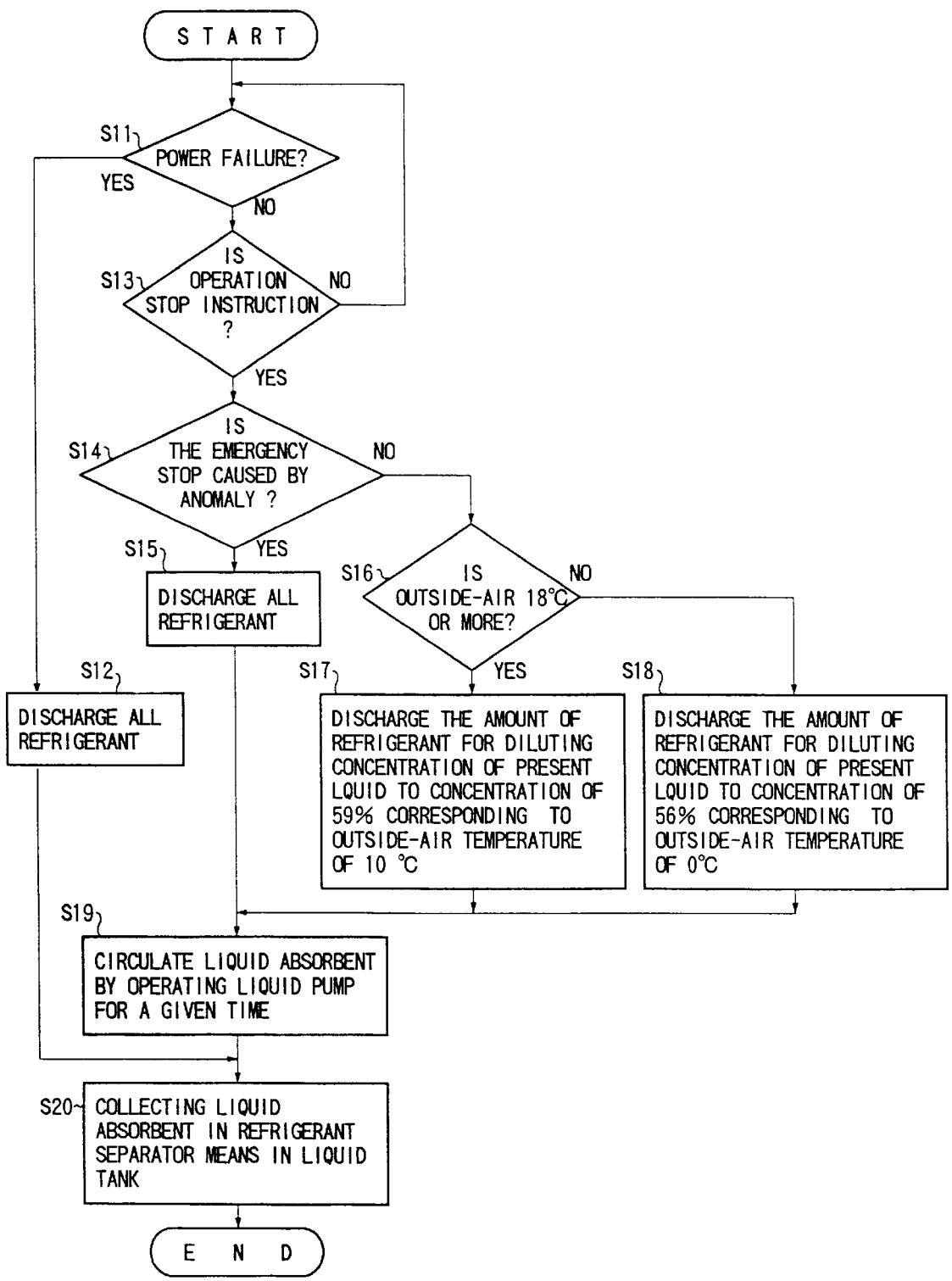

AIR CONDITIONING UNIT

BACKGROUND OF THE INVENTION

1. Field of the Invention

The present invention relates to an air conditioning unit employing liquid absorbent such as lithium bromide as collection means of vaporized refrigerant such as vapor of water.

2. Description of Prior Art

An air conditioning unit for producing cold air utilizing vaporization of refrigerant and absorbing the vaporized refrigerant by liquid absorbent is called as an absorption type air conditioning unit. That is, in case that water is used as a refrigerant, when water is dropped in the atmosphere inside the condenser kept under low pressure or in a vacuum state, water absorbs heat from the periphery thereof and evaporates instantaneously. Heat required for the evaporation is a so-called latent heat. Media such as water and air are forcibly circulated using the latent heat as a cooling source for performing heat exchange to produce cold air, which is permitted to flow in a room, thereby cooling the room.

In such an air conditioning unit, as the refrigerant which is evaporated in an evaporator is condensed and returned to the evaporator, liquid absorbent such as lithium bromide is employed. That is, the refrigerant evaporated in the evaporator is absorbed by the liquid absorbent in an absorber and collected. When the liquid absorbent is heated after it is stored in a liquid tank and the refrigerant is evaporated, the refrigerant vapor is separated from the liquid absorbent to concentrate the liquid absorbent and the refrigerant vapor is condensed and liquefied, then it is returned to the refrigerant tank while the liquid absorbent from which the refrigerant is separated is returned to the absorber.

There are prior applications relating to this type of air conditioning units each employing an absorption refrigerating machine which are disclosed in JP-A 7-103597, JP-A 7-103600, JP-A 7-103601, JP-A 7-103602, JP-A 7-103603, JP-A 7-110171, JP-A 7-158995, and there is a prior application relating to a method of separating refrigerant in an air conditioning unit disclosed in JP-A 7-332799.

Whereupon, in such an air conditioning unit, when cooling operation stops, lithium bromide may crystallize owing to the decrease of an outside-air temperature. When lithium bromide crystallizes in lines or an air conditioning unit, the liquid absorbent is prevented from flowing, thereby putting the air conditioning unit out of operation. If there is no means to cope with this situation, the air conditioning unit is liable to operate improperly, deteriorating reliability of the air conditioning unit.

Although crystallized lithium bromide can be liquefied when it is heated, there are limitations in countermeasures or prevention of lithium bromide crystallization resorting to provision of heating means in the entire lines for liquefaction of the crystallized lithium bromide, because such provision increases installation cost. Further, it is not efficient from the structural point of view to detect crystallized portions and to heat that portion locally.

SUMMARY OF THE INVENTION

It is therefore an object of the present invention to provide an air conditioning unit capable of preventing a liquid absorbent from crystallizing, thereby enhancing reliability of the operation thereof.

In the air conditioning unit of the present invention, a given amount of refrigerant 4 is supplied to dilute a liquid absorbent 20a when the air conditioning unit stops in operation, and it is circulated in lines and components of the air conditioning unit, thereby cleansing liquid absorbents (20, 20a, 20b) remaining in the components or lines, and the liquid absorbents (20, 20a, 20b) are returned to the liquid tank, so that the liquid absorbents (20, 20a, 20b) are prevented from crystallizing, thereby enhancing reliability of the operation.

The air conditioning unit of the invention comprises a refrigerant tank 6 for storing a refrigerant 4 therein, evaporation means (evaporator 2) for evaporating the refrigerant 4 supplied from the refrigerant tank 6 under low pressure and for taking latent heat from air, refrigerant collection means (vapor-liquid separator 14, absorber 18) for absorbing and collecting the refrigerant 4 which is evaporated in the evaporation means by liquid absorbent, a liquid tank 26 for storing the liquid absorbent which is introduced from the refrigerant collection means, refrigerant separation means (low temperature regenerative device 34, high temperature regenerative device 38, condenser 48) for introducing the liquid absorbent from the liquid tank 26 and separating the refrigerant 4 from the liquid absorbent, diluting means (refrigerant 4, refrigerant tank 6, line 56, solenoid valve 58) for supplying the refrigerant 4 from the refrigerant tank 6 to the liquid tank 26, thereby diluting the liquid absorbent, collection lines (lines 62, 68) for forcing the liquid absorbent diluted by the diluting means to flow into the refrigerant separation means thereby returning the refrigerant liquid absorbent remaining in the refrigerant separation means to the liquid tank, and control means (controller 130) for stopping the operation of the refrigerant separation means when the operation of the air conditioning unit stops, supplying a given amount of refrigerant from the refrigerant tank to the liquid tank corresponding to an outside-air temperature when the refrigerant separation means stops, thereby decreasing the concentration of liquid absorbent in the liquid tank to a given value or less, and circulating the liquid absorbent from the liquid tank to the refrigerant separation means so as to return it to the liquid tank.

With such an arrangement of the air conditioning unit, when it stops in operation, a given amount of refrigerant is supplied to the liquid tank corresponding to the outside-air temperature to dilute the liquid absorbent to a given concentration or less, and the liquid absorbent is circulated in the refrigerant separation means so as to cleanse the refrigerant separation means. As a result, the liquid absorbent remaining inside the refrigerant separation means and the lines on the midway thereto is collected, thereby securing the prevention of crystallization of liquid absorbent caused by the decrease of the outside-air temperature, to enhance the reliability of the cooling operation.

The air conditioning unit of the present invention is characterized in that it computes the amount of supply of the refrigerant, which flows from the refrigerant tank to the liquid tank when the air conditioning unit stops in operation so that the liquid absorbent should be diluted to reach a given concentration, in response to the concentration of the liquid absorbent when the air conditioning unit stops in operation.

The idea of the air conditioning unit of the present invention is based on that crystallization of the liquid absorbent is closely related to the outside-air temperature and the concentration of the liquid absorbent. The amount of refrigerant needed for changing the concentration of the liquid absorbent to a given concentration when the operation of the air conditioning unit stops is calculated, and the thus calculated amount of refrigerant is supplied to the liquid tank so as to change the concentration of the liquid absorbent to the degree not to crystalize. When the concentration of the liquid absorbent in the liquid tank is decreased, the crystallization of the liquid absorbent is prevented and the cleansing effect of the refrigerant separation means is enhanced.

The air conditioning unit of the present invention is further characterized in that collecting lines are provided between the line of the refrigerant separation means and the liquid tank wherein the liquid absorbent which cleansed the refrigerant separation means is quickly returned to the liquid tank through the collecting lines.

The air conditioning unit of the present invention is characterized in that the refrigerant separation means includes the low temperature regenerative device 34 for regenerating the refrigerant vapor from the vapor collected from the liquid absorbent, and the condenser 48 for condensing the refrigerant vapor which is regenerated in the low temperature regenerative device 34, wherein the concentration of the liquid absorbent to flow from the refrigerant tank to the liquid tank 26 is calculated with reference to the condensation temperature of the condenser and the liquid temperature of the low temperature regenerative device 34. It is possible to optimize the dilution of the liquid absorbent with such a temperature control, thereby preventing the refrigerant from being excessively discharged.

The air conditioning unit of the present invention is also characterized in providing a pump (liquid pump 29) in a line (circulation line 28) for introducing the liquid absorbent stored in the liquid tank 26 to the refrigerant separation means. This pump serves also as a pump used in a cooling operation cycle. The liquid absorbent 20a as the cleansing liquid can be supplied with under pressure using this pump, thereby quickly cleansing the lines or refrigerant separation means.

The air conditioning unit of the present invention is also characterized in providing a check valve in the line introducing the liquid absorbent stored in the liquid tank to the refrigerant separation means. With the provision of the check valve, it is possible to prevent the liquid absorbent from flowing back to the liquid tank owing to the pressure distribution between the liquid tank and the refrigerant separation means.

The objects, features and the effects, etc. of the present invention will be now made clearer with reference to the following explanation of various embodiments together with the attached drawings.

BRIEF DESCRIPTION OF THE DRAWINGS

FIG. 17 is a flow chart showing another example of collection control of the liquid absorbent.

DETAILED DESCRIPTION OF THE PREFERRED EMBODIMENTS

An air conditioning unit according to a preferred embodiment of the present invention will be now described in detail with reference to the attached drawings.

Figure 1:
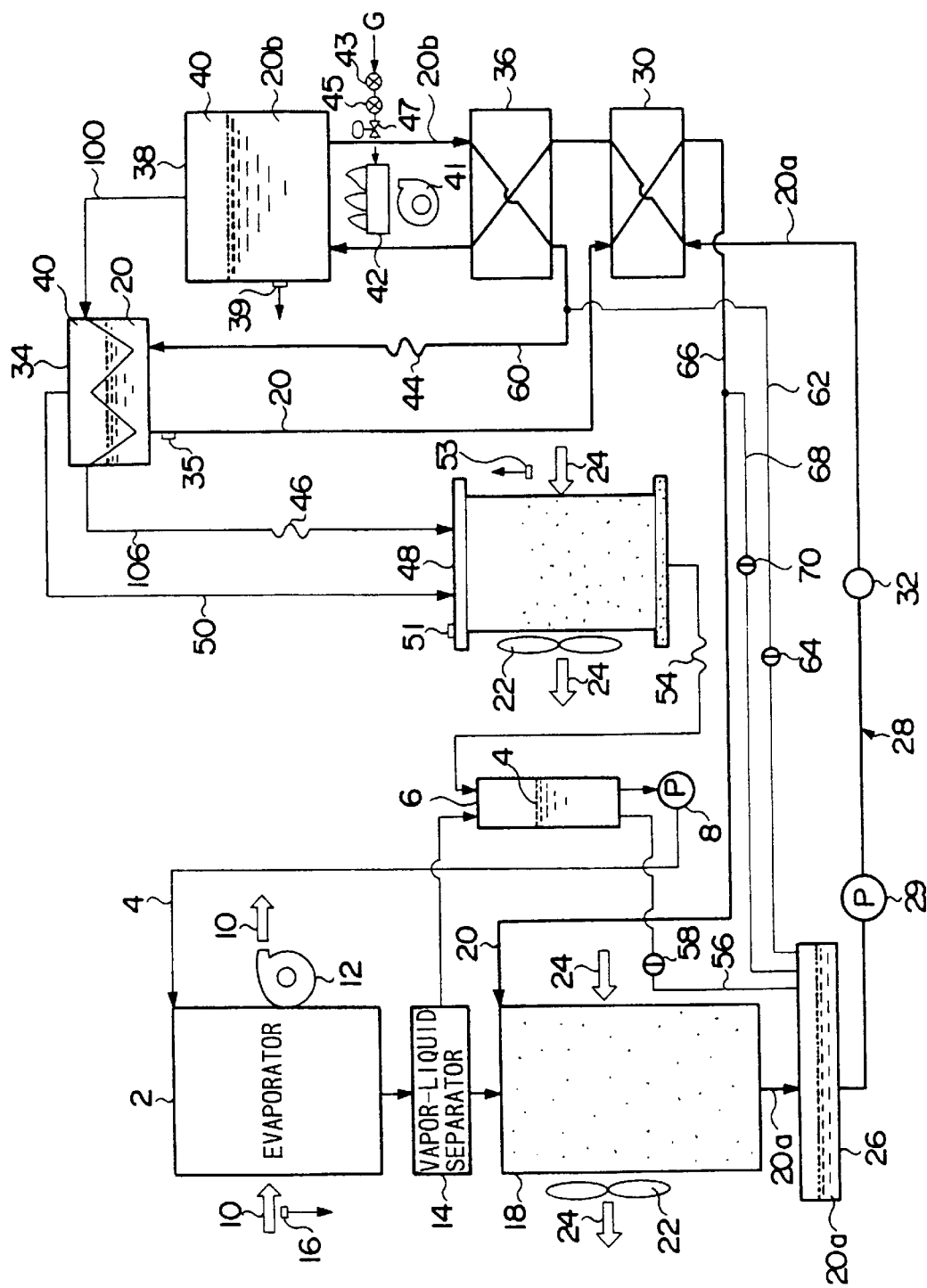
FIG. 1 is a block diagram showing an entire structure of an air conditioning unit according to a preferred embodiment of the present invention.

FIG. 1 shows an entire structure of the air conditioning unit as an embodiment of the present invention. The air conditioning unit is an absorption type utilizing water as an example of refrigerant and lithium bromide as an example of liquid absorbent.

There is provided an evaporator 2 as evaporation means for evaporating a refrigerant 4. The evaporator 2 is means for producing cold air by evaporation of the refrigerant 4, and for cooling room temperature by the same cold air. The inside of the evaporator 2 is set under a reduced inner pressure of, e.g., about 8.9 torr. The refrigerant 4 is supplied from the refrigerant tank 6 to the evaporator 2 through a refrigerant pump 8. That is, when liquid refrigerant, e.g., water drops under reduced pressure, the drops of water are evaporated and they are cooled when taking latent heat from flowing (circulating) room air 10. The evaporator 2 draws the room air 10 to be cooled through a room fan 12, and circulates it, thereby cooling the room air 10. The evaporator 2 evaporates the dropped refrigerant 4 wherein a part of the refrigerant 4 remains therein as liquid without being evaporated. When water is used as the refrigerant 4, it becomes vapor under vacuum and a part of water remains liquid water. The refrigerant 4 which is vaporized or remains liquid in the evaporator 2 is introduced into a vapor-liquid separator 14 serving as refrigerant collection means through a line. The temperature of the room air 10 is detected by a temperature censor 16.

The vapor-liquid separator 14 is means for separating the refrigerant 4 into vapor and liquid. The vapor-liquid separator 14 can be structured integrally with or separately from the evaporator 2. The inner pressure of the vapor-liquid separator 14 is the same as that of the evaporator 2. The refrigerant 4 in liquid form is introduced to the refrigerant tank 6 through a line and collected, and the refrigerant vapor is introduced into an absorber 18.

The absorber 18 permits the refrigerant vapor to be absorbed by liquid absorbent 20, e.g., lithium bromide solution. That is, when the liquid absorbent 20 is sprayed into refrigerant vapor in the absorber 18 which is introduced from the vapor-liquid separator 14, the refrigerant vapor is absorbed by the liquid absorbent 20. It is necessary to cool the absorber 18 in order to permit the refrigerant vapor to be efficiently absorbed by the liquid absorbent 20 and to discharge the evaporated latent heat which is taken out from air to the outside. A cooling fan 22 as cooling means is provided for cooling the absorber 18 by making it in contact with the outside-air 24. At the same time, the absorber 18 is reduced in pressure to provide the difference in pressure between itself and the evaporator 2, thereby producing a drawing force for introducing the refrigerant vapor into the absorber 18. Heat of reaction produced when the liquid absorbent 20 absorbs refrigerant vapor is removed by the cooling fan 22. A liquid absorbent 20*a* which absorbed the refrigerant vapor is introduced into the liquid tank 26 through a line.

The liquid tank 26 stores therein the liquid absorbent 20*a* which absorbed the refrigerant vapor in the absorber 18. Suppose that the amount of entire solution of the circulating liquid absorbent 20 and refrigerant 4 is about 3 litter, the liquid tank 26 has a volume capable of storing the same amount of the entire solution.

A liquid pump 29 serving as means for supplying liquid or solution under pressure is provided in a circulation line 28. The liquid absorbent 20*a* in the liquid tank 26 is supplied to refrigerant separation means where the refrigerant 4 is separated. That is, the liquid absorbent 20*a* is supplied under pressure to a low temperature heat exchanger 30 through a liquid pump 29.

A check valve 32 is provided in the circulation line 28 between the liquid tank 26 and the liquid pump 29. The check valve 32 prevents the liquid from flowing back to the liquid pump 29, namely prevents the liquid absorbent 20*a* from returning to the liquid pump 29 owing to the pressure difference.

The low temperature heat exchanger 30 is means for preliminarily heating the liquid absorbent 20*a* which is supplied under pressure from the liquid pump 29 in advance by the heat (e.g., 100° C.) of the liquid absorbent 20 (dense liquid) which is introduced from a low temperature regenerative device 34. As a result, the liquid absorbent 20*a* is heated to the temperature of about 100° C., and the liquid absorbent 20*a* which is heated preliminarily is introduced into a high temperature heat exchanger 36 through a circulation line.

The high temperature heat exchanger 36 is means for preliminarily heating the liquid absorbent 20*a* which is preliminarily heated in advance by the low temperature heat exchanger 30 by the heat (e.g., 180° C.) of the liquid absorbent 20*b* (medium liquid (solution of intermediate concentration)) which is introduced from a high temperature regenerative device 38. The heated liquid absorbent 20*b* is introduced into the high temperature regenerative device 38 through a line.

A gas burner 42 serving as heating means is provided in the high temperature regenerative device 38, and the liquid absorbent 20*a* is heated to the temperature of about 180° C. by the combustion of fuel gas G. The fuel gas G is supplied to the gas burner 42 through gas solenoid valves 43 and 45 and a gas proportional valve 47, and combustion air is supplied by a combustion fan 41. As a result of combustion of the fuel gas G, the refrigerant 4 absorbed in the liquid absorbent 20*a* is heated and vaporized, and hence refrigerant vapor 40 and the liquid absorbent 20*b* (medium liquid) whose concentration is increased by the amount of the removed refrigerant 4 are stored in the upper portion of the high temperature regenerative device 38 where the pressure becomes high, namely the pressure increases to 1300 torr at the outside-air temperature of 35° C. Then the liquid absorbent (middle liquid) is separated into the liquid absorbent 20*b* and the refrigerant vapor 40 by gravity thereof, and the liquid level of the liquid absorbent 20*b* keeps constant. Since the liquid absorbent 20*b* (medium liquid) is introduced into the high temperature heat exchanger 36 and the heat is transferred from the liquid absorbent 20*b* by the preliminarily heating of the liquid absorbent 20*a*, the temperature of the liquid absorbent 20*b* decreases from 180° C. to about 112° C., then it is introduced into the low temperature regenerative device 34 through a capillary 44 and a line 60. The temperature of the high temperature regenerative device 38 is detected by a temperature sensor 39.

The capillary 44 is a pressure resistor for keeping the difference in pressure between the high temperature regenerative device 38 and low temperature regenerative device 34. That is, the high pressure of about 1300 torr in the high temperature regenerative device 38 permits the liquid absorbent 20*b* (medium liquid) to be introduced into the low temperature regenerative device 34 which is reduced in pressure of about 95 torr through the capillary 44.

The refrigerant vapor 40 of high temperature, e.g., about 180° C. is introduced from the high temperature regenerative device 38 into the low temperature regenerative device 34, and the low temperature regenerative device 34 heats the liquid absorbent 20*b* (medium liquid) supplied from the high temperature heat exchanger 36 and discharges the high temperature refrigerant vapor 40 which is used as a heat source. The temperature of the liquid absorbent 20 in the low temperature regenerative device 34 increases from 102° C. to 112° C., and the refrigerant 4 inside the liquid absorbent 20*b* is changed to the refrigerant vapor 40 of about 112° C. which is then collected. The temperature of the liquid absorbent 20*b* in the low temperature regenerative device 34 is detected by a temperature sensor 35.

The liquid absorbent 20 (dense liquid (solution of high concentration)) heated in the low temperature regenerative device 34 is introduced into the low temperature heat exchanger 30 where the heat is transferred from the liquid absorbent 20 by using it for preliminarily heating the liquid absorbent 20*a*, and hence the liquid absorbent 20 is cooled to the temperature of about 60° C. The liquid absorbent 20 is introduced into the absorber 18 where it is used for absorbing the refrigerant 4. The refrigerant 4 which is liquefied in the low temperature regenerative device 34 is introduced into the condenser 48 through a line 106 and a capillary 46, while the refrigerant vapor 40 is introduced into the condenser 48 through a circulation line 50.

The condenser 48 is a means for liquefying and condensing the refrigerant vapor 40 and the cooling fan 22 serving as cooling means is used in common so as to cool the refrigerant vapor 40 by making it contact with the outside-air 24. The refrigerant vapor 40 from the low temperature regenerative device 34 is liquefied when it is cooled, then it is stored in the refrigerant tank 6 through a capillary 54. The condensation temperature in the condenser 48 is detected by a temperature sensor 51, and the outside-air temperature is detected by a temperature sensor 53.

The refrigerant tank 6 is means for storing therein the refrigerant 4 to be supplied to the evaporator 2, and it is held under low pressure of about 8.9 torr. That is, the refrigerant 4 which is collected in the condenser 48 or vapor-liquid separator 14 is stored in a liquid state therein.

There is formed appropriate difference in pressures between the evaporator 2, refrigerant tank 6, vapor-liquid separator 14, liquid tank 26, high temperature regenerative device 38, low temperature regenerative device 34 and condenser 48, and the difference realizes the natural circulation operation of the liquid absorbent 20 and refrigerant vapor 40. In a word, the difference in pressures generates circulation operation of the liquid absorbents 20a and 20b by the heating in the high temperature regenerative device 38 and the cooling to a constant temperature in the condenser 48, the absorption of the refrigerant 4 by the liquid absorbent 20 and the condensation of the refrigerant vapor 40.

There is provided diluting means for diluting the liquid absorbent 20a in the liquid tank 26 by the refrigerant 4. In this preferred embodiment, a line 56 is provided between the refrigerant tank 6 and liquid tank 26 as means for discharging the refrigerant 4 into the liquid tank 26 and a solenoid valve 58 is provided as means for opening and closing the line 56.

There is provided a line 62 serving as bypass means for permitting direct addition of the liquid absorbent 20 in the liquid tank 26. Solenoid valve 64 for opening and closing the line 62 connected to the line 60 for completing a path between the high temperature heat exchanger 36 and the low temperature regenerative device 34.

There is provided a line 68 serving as bypass means for permitting direct addition of the liquid absorbent 20 to liquid tank 26. Solenoid valve 70 is for opening and closing the line 68 line 66 for completing a path between low temperature heat exchanger 30 and the absorber 18.

Figure 2:
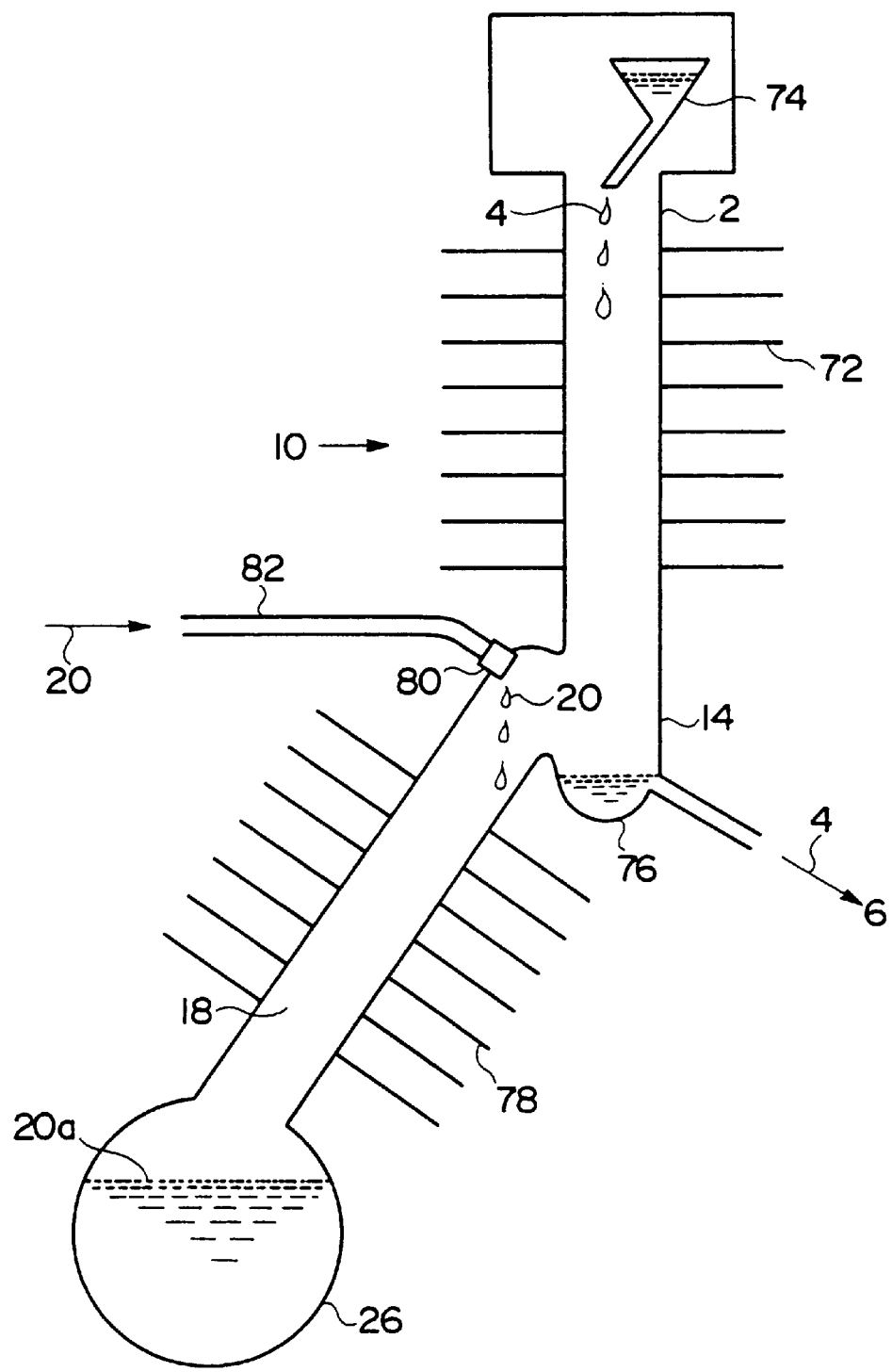
FIG. 2 is a view for explaining a piping extending from an evaporator to a liquid tank in the air conditioning unit.

FIG. 2 shows a system of the air conditioning unit limited to the components extending from the evaporator 2 to the liquid tank 26.

The evaporator 2, vapor-liquid separator 14, absorber 18 and liquid tank 26 structure a single closed space and fins 72 for cooling are provided at the peripheral surface of the evaporator 2 formed of a vertical pipe. Since the evaporator 2 is under vacuum, the refrigerant 4 is evaporated when the refrigerant 4 drops from a funnel-shaped refrigerant drop device 74. The latent heat is removed from the room air 10 by way of the fins 72 and the room air 10 is cooled. The liquefied refrigerant 4 dropped from the refrigerant drop device 74 is stored in a refrigerant storage portion 76 of the vapor-liquid separator 14 owing to its gravity, and it is introduced into the refrigerant tank 6.

There is provided the absorber 18 between the vapor-liquid separator 14 and liquid tank 26 with a given inclination angle. The fins 78 like the fins 72 about the evaporator 2 are formed at the peripheral surface of the absorber 18. The liquid absorbent is cooled by the fins 78 and the cooling fan 22 shown in FIG. 1.

There is provided a dropping portion 80 of the liquid absorbent 20 on the upper portion of the absorber 18, wherein the liquid absorbent 20 drops inside the absorber 18 through a supply pipe 82. Suppose that the liquid absorbent 20 is, e.g. lithium bromide and the refrigerant 4 is water, i.e. vapor of water, the vapor of water is efficiently absorbed by the dropping 20.

The heat of reaction generated when the refrigerant 4 is absorbed by the liquid absorbent 20 is discharged to the outside-air 24 through the fins 78 so that the liquid absorbent 20a inside the absorber 18 is cooled. The liquid absorbent 20a is stored in the liquid tank 26 in a state where it drops naturally.

Figure 3:
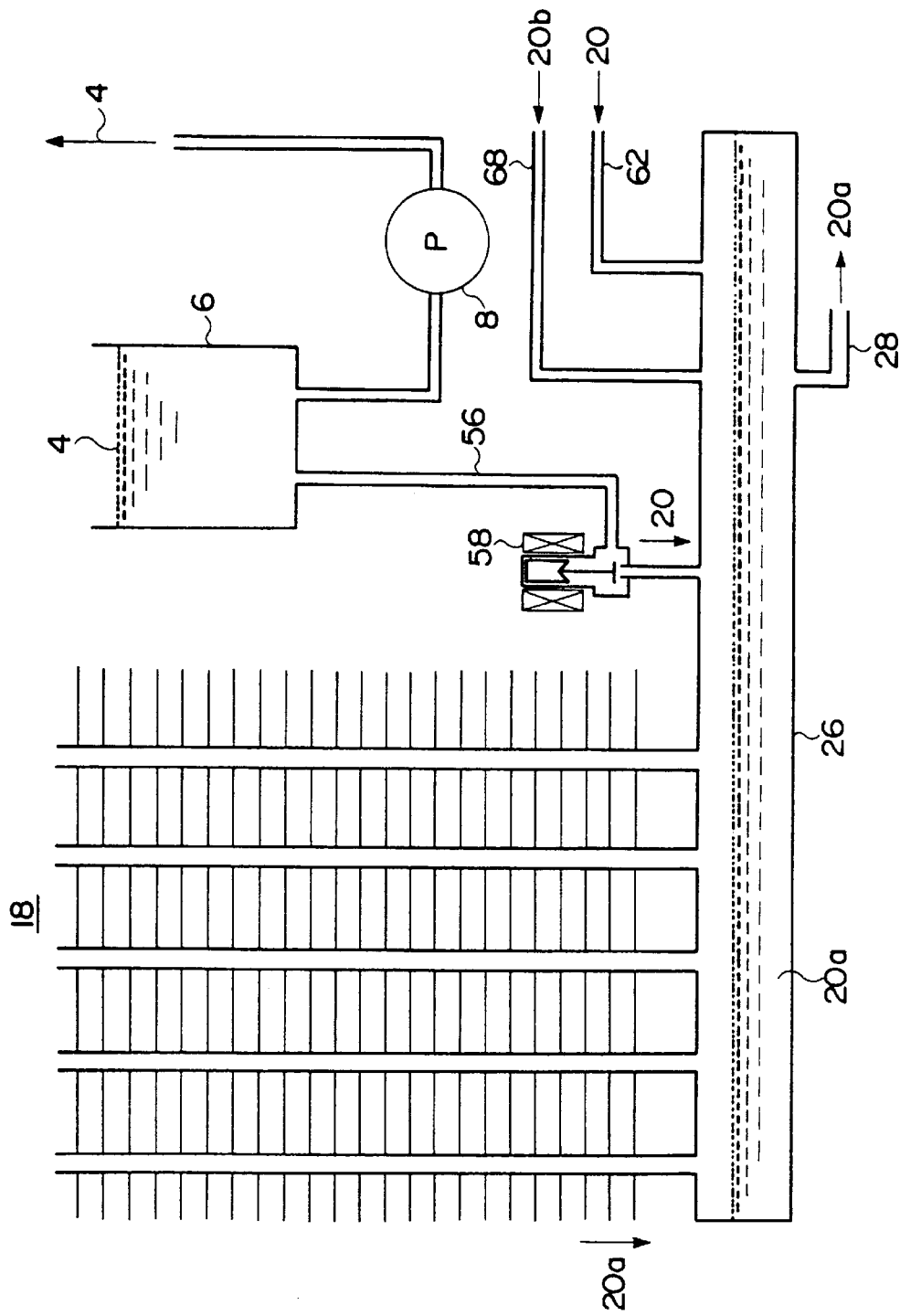
FIG. 3 is a view for explaining a system including an absorber, a refrigerant tank and a liquid tank.

FIG. 3 shows a piping system of the refrigerant tank 6, absorber 18 and liquid tank 26 in the air conditioning unit. These refrigerant tank 6, absorber 18, and the lines 68 and 62 are respectively disposed over the liquid tank 26 for permitting the liquid absorbents 20, 20a and 20b from the refrigerant tank 6, absorber 18 and lines 68 and 62 to drop naturally in the liquid tank 26 owing to gravity thereof.

Figure 4:
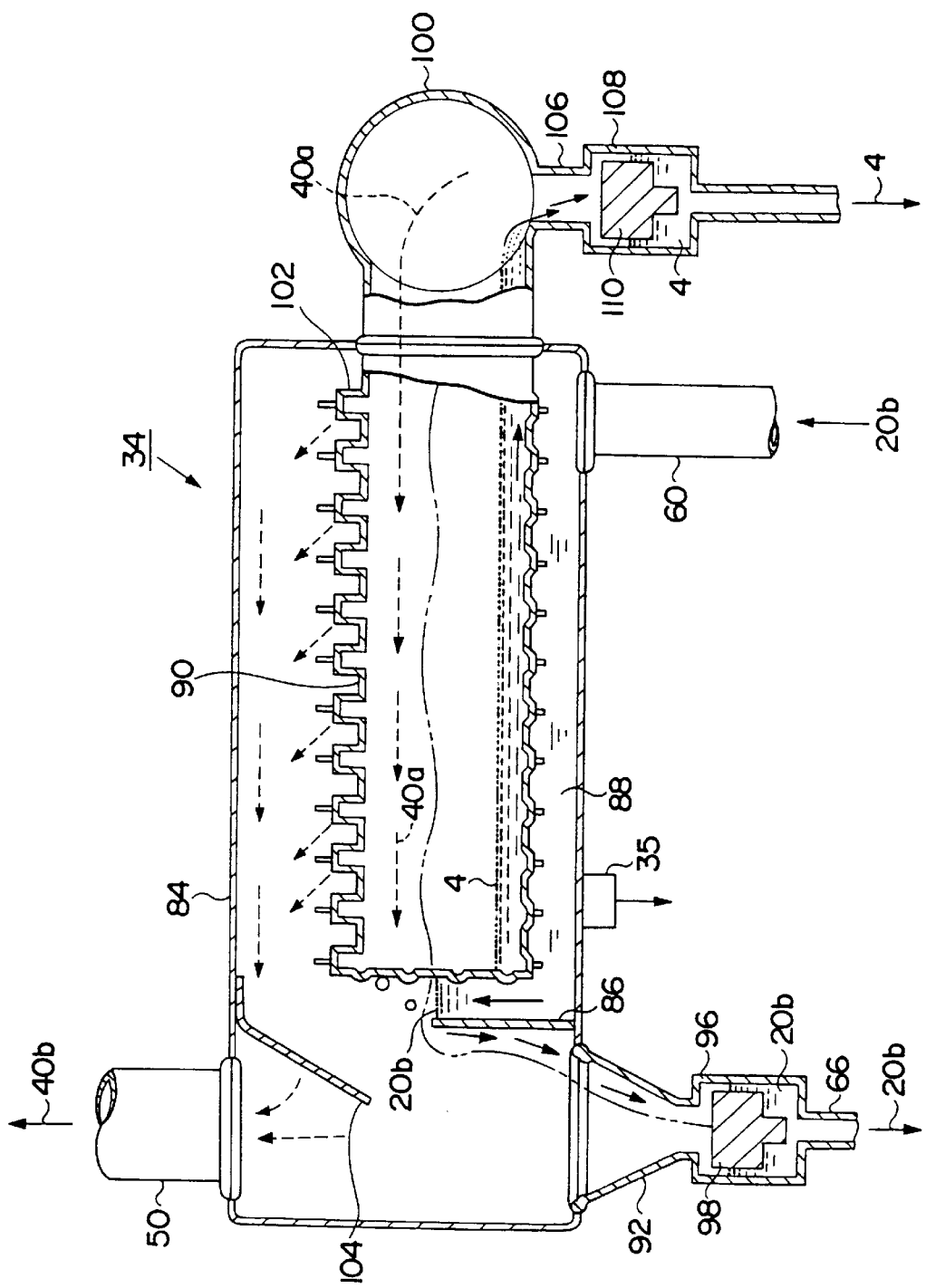
FIG. 4 is a longitudinal sectional view showing a low temperature regenerative device in the air conditioning unit.

FIG. 4 shows an embodiment of the low temperature regenerative device 34 in the air conditioning unit. The low temperature regenerative device 34 re-heats liquid absorbent 20b utilizing heat of refrigerant vapor 40a generated when the refrigerant 4 is heated in the high temperature regenerative device 38, and the refrigerant vapor 40a is condensed into the refrigerant 4 by the transfer of heat therefrom.

The low temperature regenerative device 34 comprises an air tight body case 84, a liquid absorbent storing portion 88 formed by partitioning inside of the body case 84 by a partitioning wall 86, and a heat exchanging portion 90 to be immersed into the liquid absorbent 20b in the liquid absorbent storing portion 88. The line 60 is connected to the liquid absorbent storing portion 88 and the liquid absorbent 20b is supplied from the high temperature regenerative device 38 to the low temperature regenerative device 34 through the line 60. The liquid absorbent 20b which gets over the partitioning wall 86 drops in a funnel-shaped collection portion 92. There is provided a float chamber 96, which serves as means for shutting off the refrigerant vapor 40, in the line 66 under the funnel-shaped collection portion 92. The liquid absorbent 20b is stored in the float chamber 96 and a float valve 98 is provided in the float chamber 96. That is, the float valve 98 permits the liquid absorbent 20b to pass therethrough when the former floats on the latter, and when the liquid absorbent 20b is not present in the float chamber 96, the line 66 closes so as to shut off the refrigerant vapor 40. The liquid absorbent 20b passed through the float chamber 96 is introduced to the absorber 18 through the line 66. The temperature of the liquid absorbent 20b in the low temperature regenerative device 34 is detected by the temperature sensor 35.

A supply pipe 100 is connected to the body case 84 at the outer portion thereof, and the refrigerant vapor 40 is supplied from the high temperature regenerative device 38 into the low temperature regenerative device 34. An irregular portion 102 formed by bending the wall surface is provided in the outer peripheral portion of the heat exchanging portion 90 to increase the heat absorption area. The refrigerant vapor 40a enters the heat exchanging portion 90 through the irregular portion 102 and gives off heat to the liquid absorbent 20b so that the liquid absorbent 20b is heated to create refrigerant vapor 40b. The refrigerant vapor 40b is introduced into the condenser 48 through the circulation line 50 connected to the condenser 48. A shielding plate 104 is attached to the ceiling of the body case 84 to prevent the boiled splash of the heated liquid absorbent 20b from being introduced into the condenser 48 through the circulation line 50.

The line 106 is connected to the supply pipe 100 at the lower side thereof for introducing the refrigerant 4, which is produced when the refrigerant vapor 40a is condensed in the heat exchanging portion 90, into the outside. There is provided a float chamber 108 in the line 106 serving as means for shutting off the refrigerant vapor 40. The refrigerant 4 is stored in the float chamber 108 and a float valve 110 is provided in the float chamber 108. That is, the float valve 110 permits the refrigerant 4 to pass therethrough when the former floats on the latter, and it closes the line 106 when the refrigerant 4 is not present in the float chamber 108, thereby shutting off the refrigerant 4. The refrigerant 4 passed through the float chamber 108 is introduced into the condenser 48 through the line 106.

Figure 5:
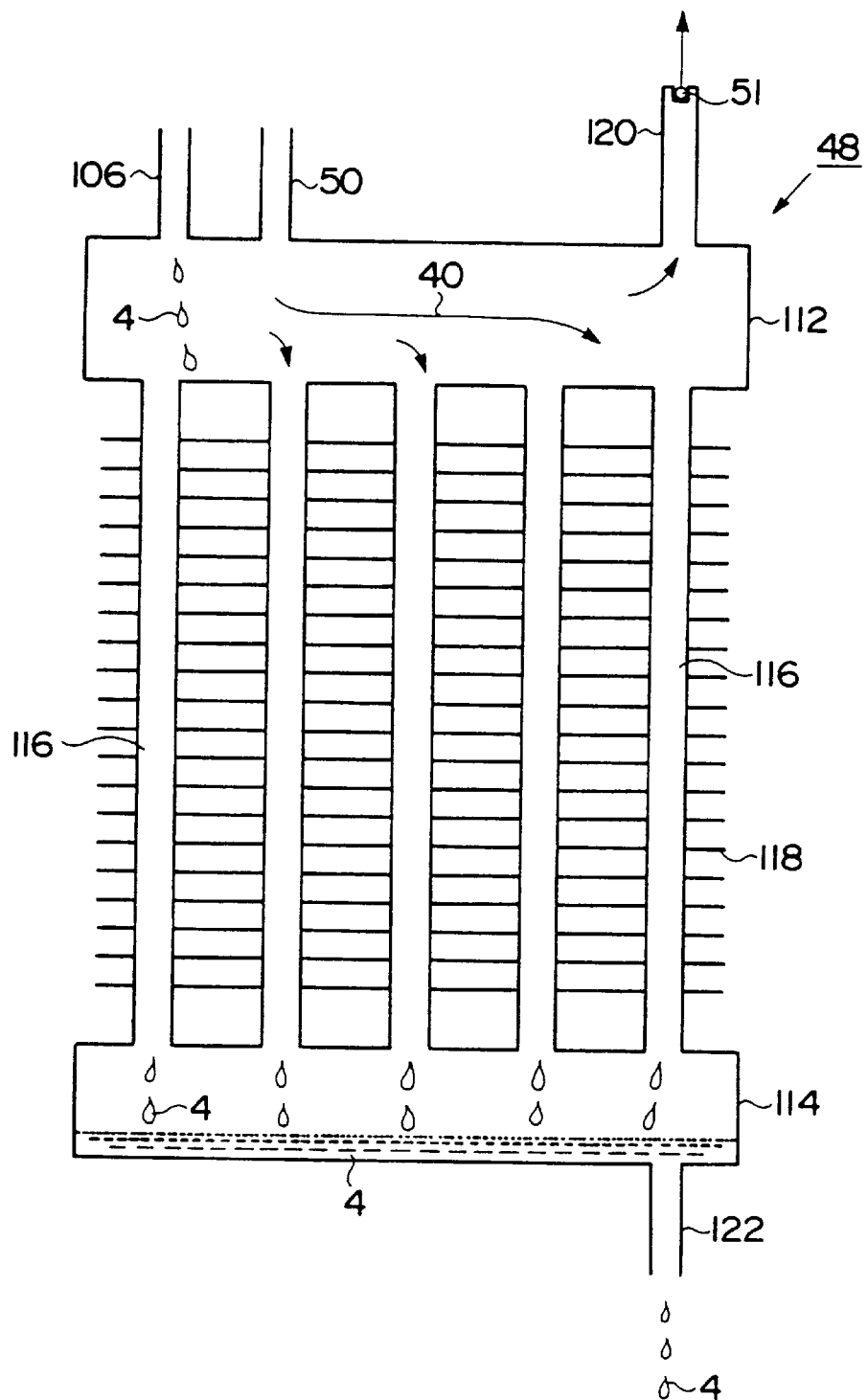
FIG. 5 is a view for explaining a condenser in the air conditioning unit.

FIG. 5 shows an example of the condenser 48 in the air conditioning unit. The condenser 48 receives the refrigerant vapor 40 and refrigerant 4 from the low temperature regenerative device 34, then condenses the refrigerant vapor 40 and thereafter returns the condensed refrigerant vapor 40 to the refrigerant tank 6. The condenser 48 has an upper header 112 and a lower header 114 which are connected to each other by a plurality of condensation pipes 116. Radiating fins 118 are attached to each condensation pipe 116.

The refrigerant vapor 40 is supplied into the upper header 112 through the circulation line 50 and the refrigerant 4 is supplied into the upper header 112 through the line 106. A temperature detecting pipe 120 is provided in the upper header 112 and it has the temperature sensor 51 therein to detect the condensation temperature of the refrigerant vapor 40. The refrigerant 4 which is condensed while passing through each condensation pipe 116 is stored in the lower header 114 and is collected in the refrigerant tank 6 through a discharge pipe 122.

Figure 6:
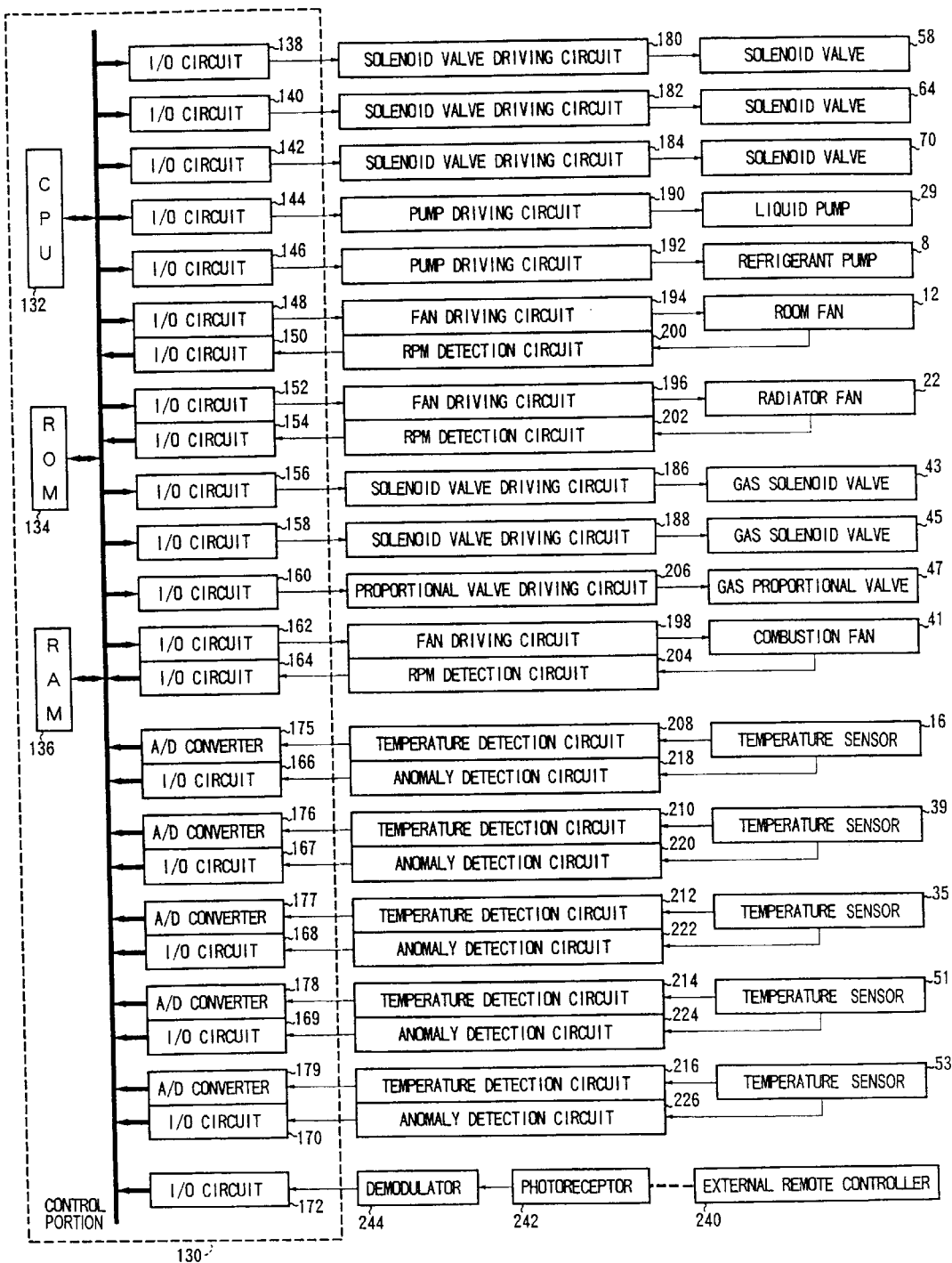
FIG. 6 is a block diagram showing control systems in the air conditioning unit.

FIG. 6 shows an embodiment of a control system of the air conditioning unit. The control system performs various control functions such as rotating control of various fans, combustion control and monitoring of the combustion system, detection of anomaly and control for avoiding danger caused by such anomaly, control of diluting the liquid absorbent and collecting thereof, and various controls of cooling operation and various operations incident thereto.

A control portion 130 comprising a microprocessor is provided in the control system. Provided in the control portion 130 are a central processing unit (CPU) 132, a ROM 134, a RAM 136, input/output (I/O) circuits 138, 140, 142, 144, 146, 148, 150, 152, 154, 156, 158, 160, 162, 164, 166, 167, 168, 169, 170 and 172, analog/digital (A/D) converters 175, 176, 177, 178 and 179.

Connected to the control portion 130 are solenoid valve driving circuits 180, 182, 184, 186 and 188, pump driving circuits 190 and 192, fan driving circuits 194, 196 and 198, detection circuits for detecting speed of rotation (hereinafter referred to as rpm detection circuits) 200, 202 and 204, a proportional valve driving circuit 206, temperature detection circuits 208, 210, 212, 214 and 216, anomaly detection circuits 218, 220, 222, 224 and 226. Each of the anomaly detection circuits 218, 220, 222, 224 and 226 separately detects the breakage of lines and anomaly detection of each of the temperature sensors 16, 39, 35, 51 and 53.

An external remote controller 240 is provided as means for remotely controlling the control portion 130. A photoreceptor 242 for receiving light emitted by the external remote controller 240 is provided to optically perform the transmission and reception of data between itself and the external remote controller 240. There is provided a demodulator 244 for demodulating data signals received by the photoreceptor 242. The data which is demodulated by the demodulator 244 is applied to the control portion 130 so as to perform a given control by the external remote controller 240.

Figure 7:
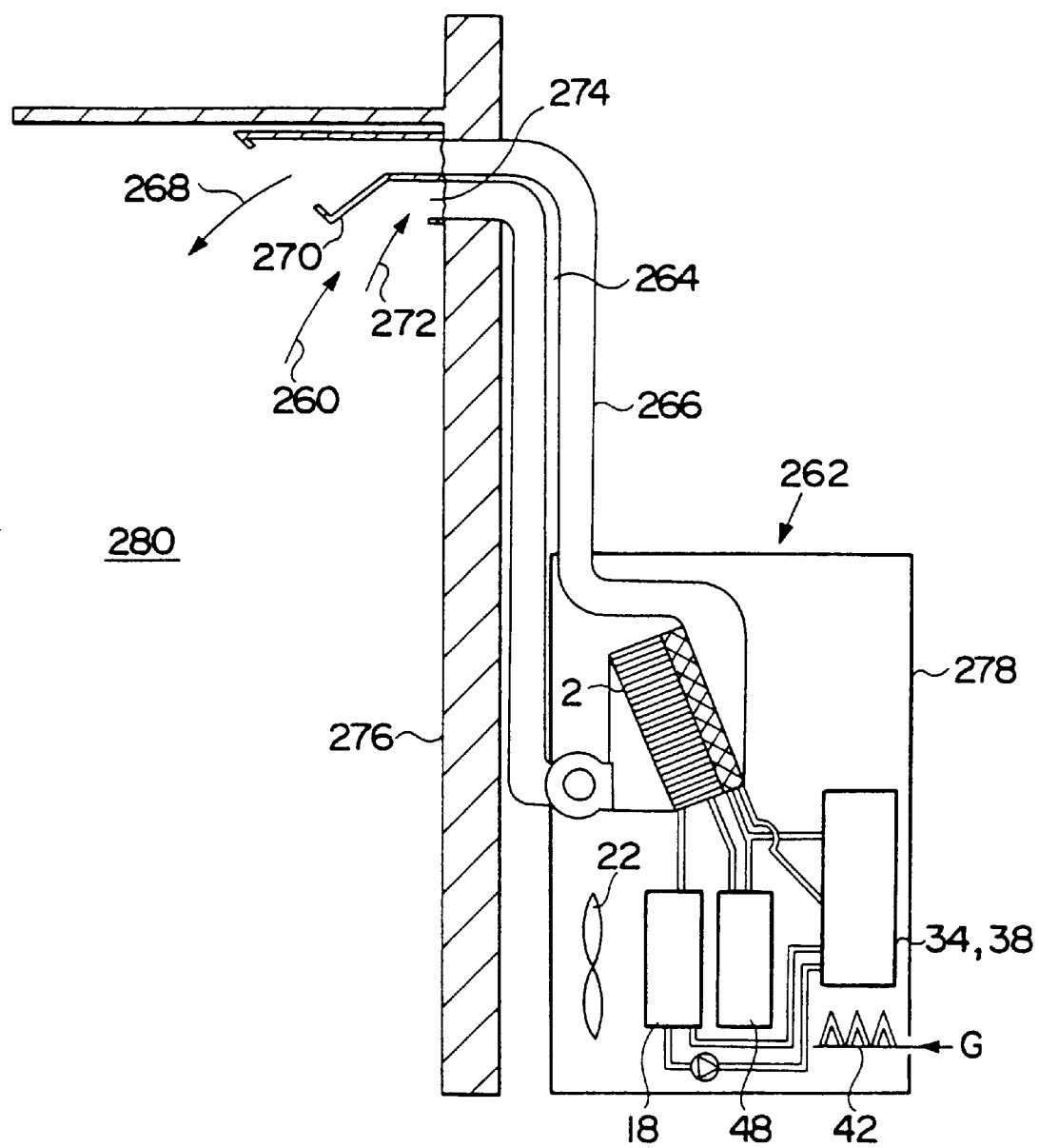
FIG. 7 is a view for explaining the manner of installation of and the cooling operation of the air conditioning unit.

FIG. 7 a view for explaining the manner of installation of the air conditioning unit of the present invention.

The air conditioning unit comprises an indoor unit 260 installed inside a house, etc. and outdoor unit 262 installed outside the house, etc., and both the units 260 and 262 are connected to each other by lines 264 and 266. The indoor unit 260 comprises a cold air blowoff portion 270 for discharging cold air 268 and an air suction portion 274 for drawing room air 272 in, and these portions 270 and 274 are respectively attached to a wall portion 276 of the house, etc. In this case, the lines 264 and 266 penetrate the wall portion 276 and are connected to the outdoor unit 262. The outdoor unit 262 comprises an air conditioning unit body 278 composed of the evaporator 2, the low temperature regenerative device 34, the high temperature regenerative device 38, the condenser 48, the absorber 18, and the gas burner 42, etc. Accordingly, the room air 272 drawn in through the suction portion 274 is subjected to heat exchange in the air conditioning unit body 278, and cooled so that the cooled air passes through the line 266 and the cold air blowoff portion 270, and it enters indoors 280, thereby producing the cold air 268 to cool the indoors 280.

Figure 8:
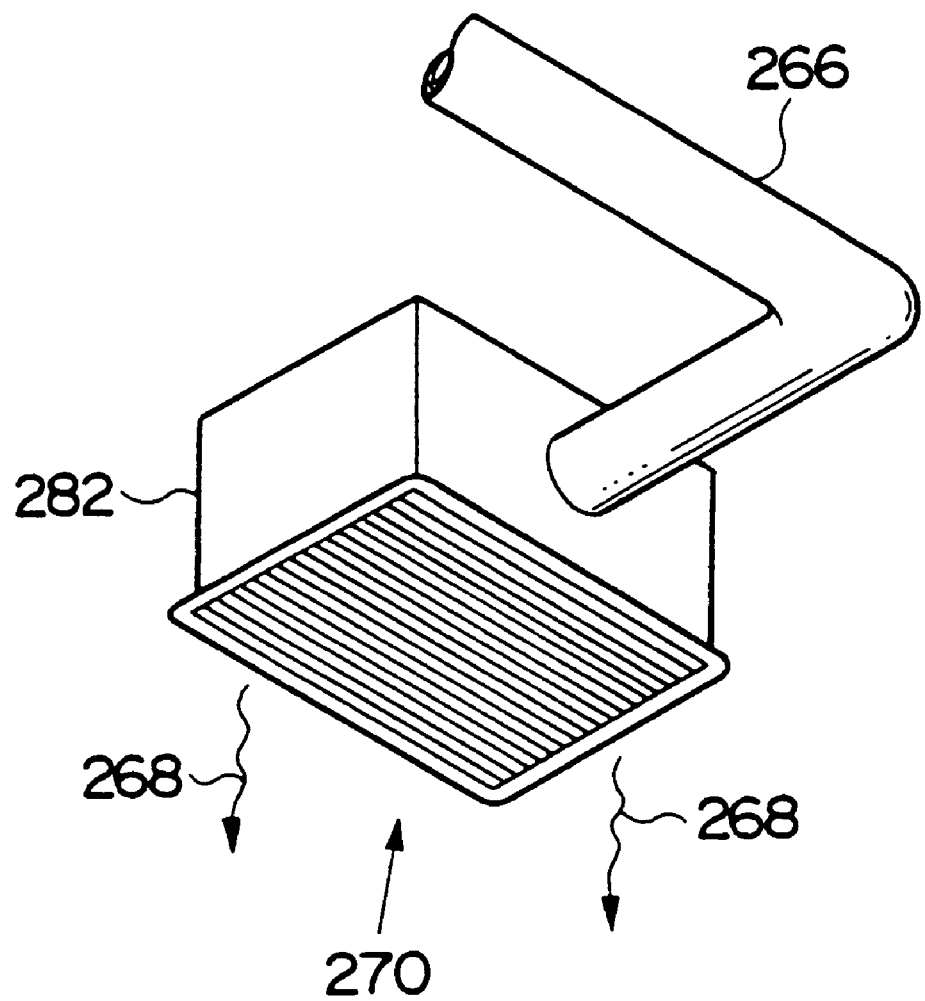
FIG. 8 is a perspective view showing an example of a cold air blowoff portion.

FIG. 8 shows an example of the cold air blowoff portion 270. The line 266 is provided on a rectangular grill 282 through which the cold air 268 can blow off.

Figure 9:
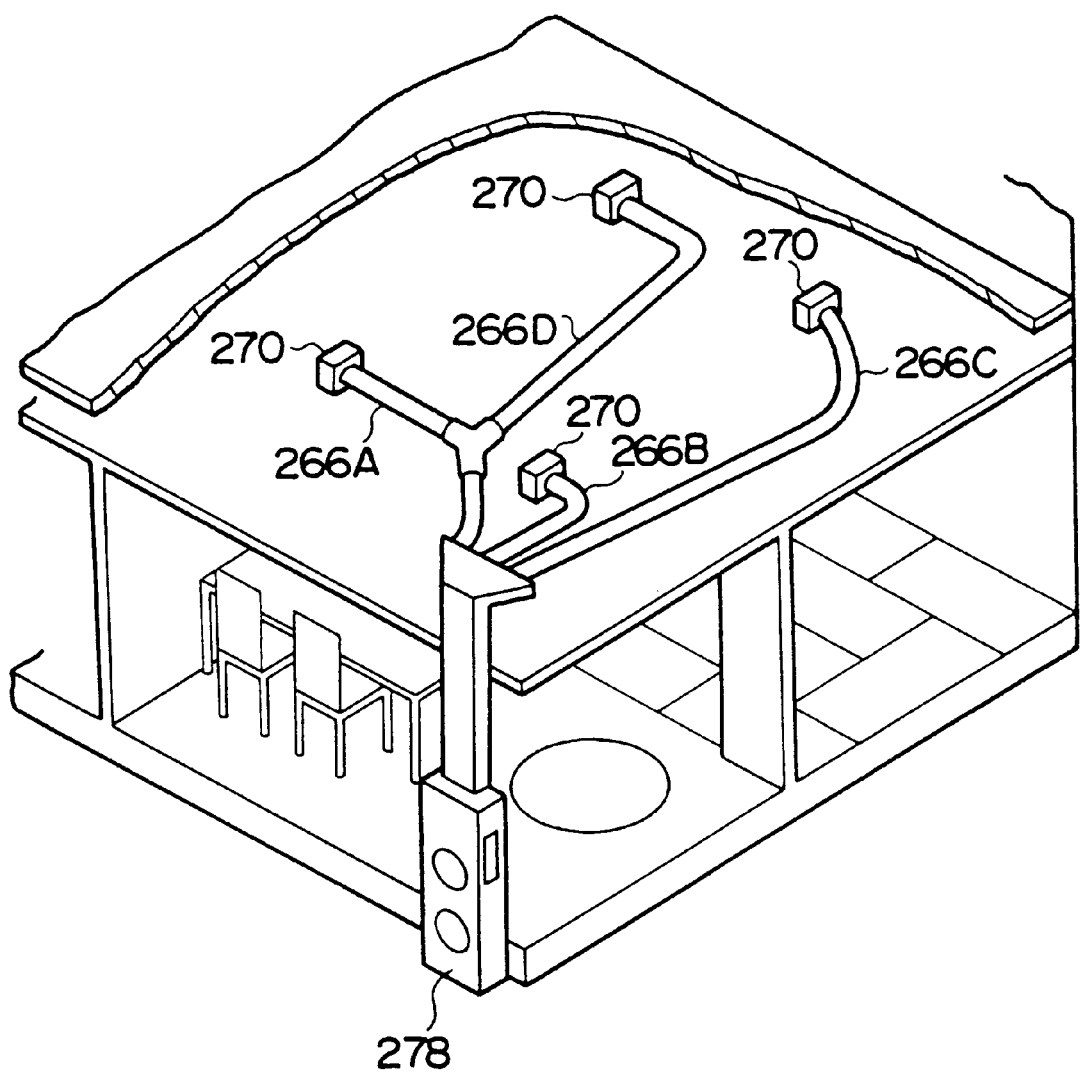
FIG. 9 is a perspective view showing the manner of installation of the cold air blowoff portion.
Figure 10:
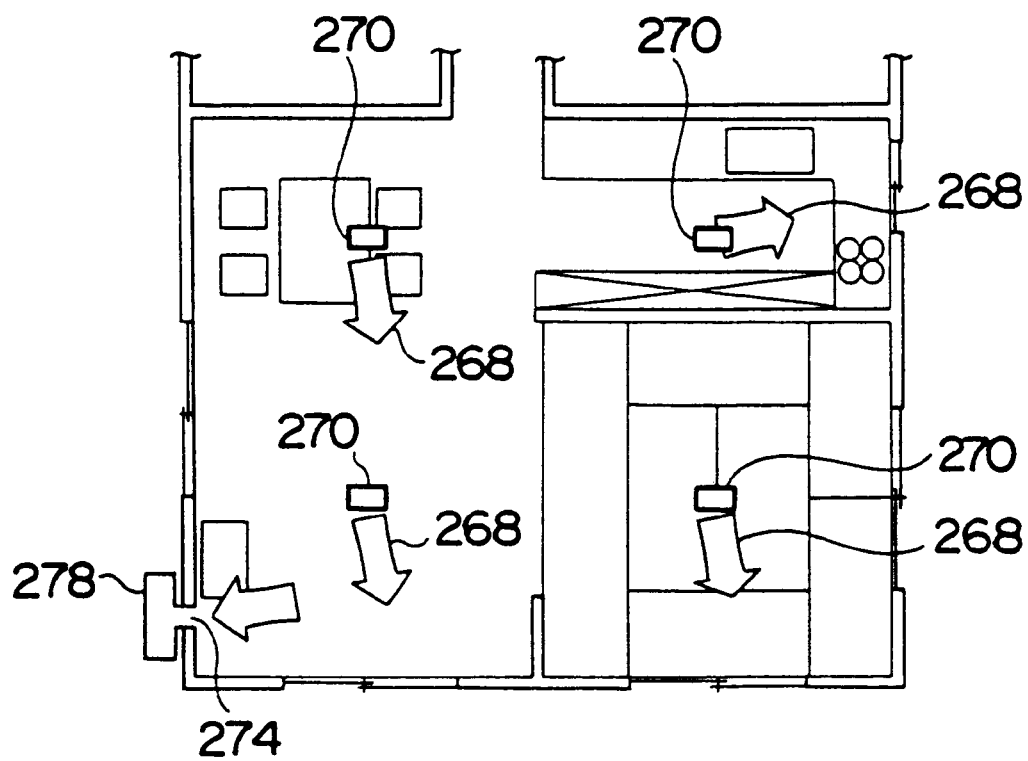
FIG. 10 is a plan view showing the manner of installation of the cold air blowoff portion.

FIGS. 9 and 10 are respectively showing an example of installation of the cold air blowoff portion 270. There is provided a single air conditioning unit body 278 which sucks the room air 272 through the suction portion 274, so that the cold air 268 can be blown off from the cold air blowoff portions 270 respectively installed in each room through a plurality of lines 266A, 266B, 266C and 266D. It is also possible to cool the entire rooms or one or any of the rooms selectively by providing pipes in each room together with the lines 264 and 266.

Figure 11:
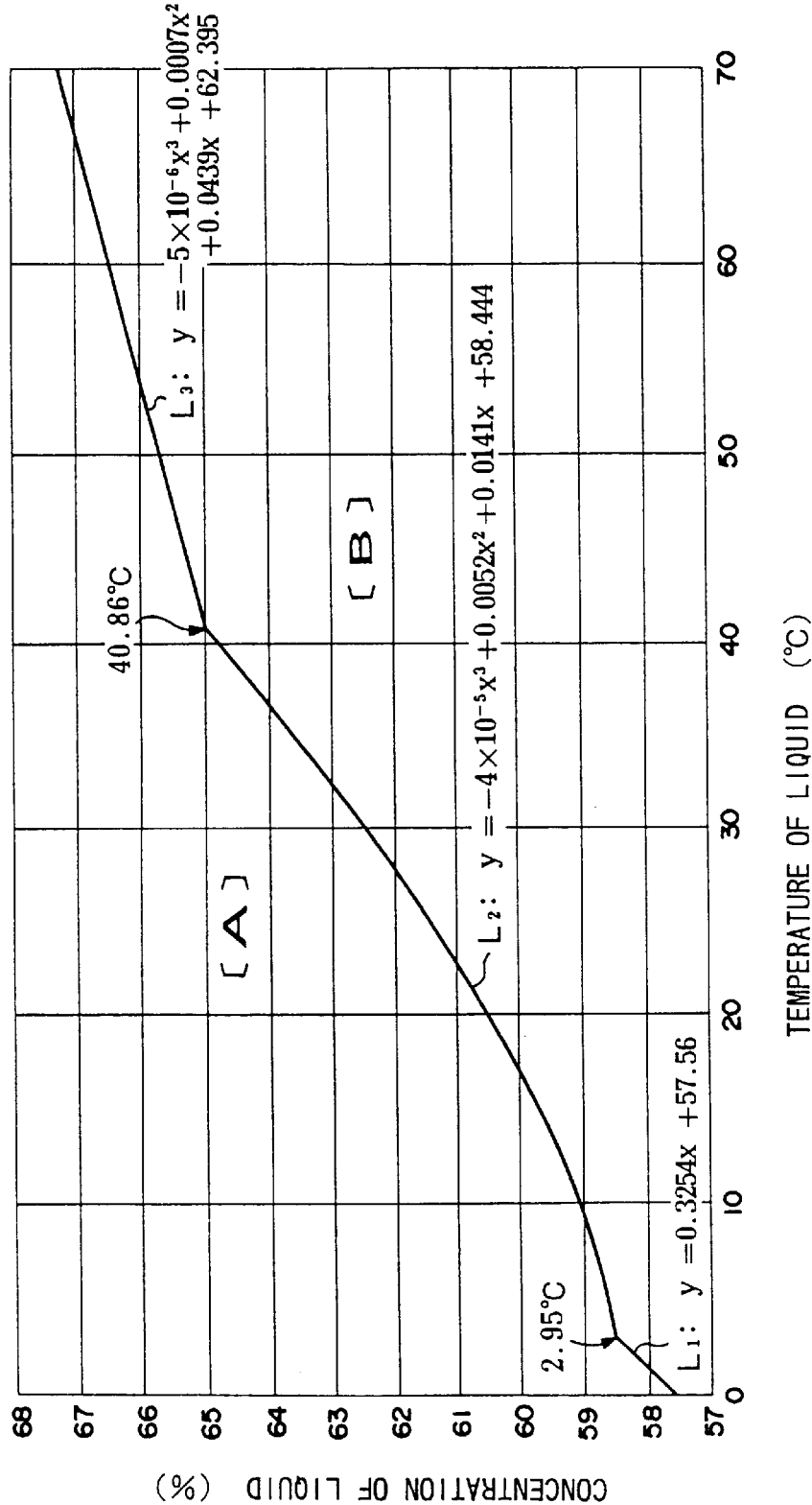
FIG. 11 is a view showing characteristic curve of the crystallization limit of the aqueous solution of lithium bromide.

FIG. 11 is a graph showing characteristics curve of the crystallization line of aqueous solution of lithium bromide. The abscissa of the characteristic curve represents solution temperature (°C.), and an ordinate thereof represents solution concentration (%), which shows the liquefaction limit, and it is a nonlinear characteristic comprising different characteristics $L_1$, $L_2$ and $L_3$ which are differentiated in increment and decrement tendency. An area A is a crystallization one and an area B is a liquefying one respectively partitioning by each characteristics $L_1$, $L_2$ and $L_3$ as a boundary thereof. For example, although the aqueous solution of lithium bromide is in an uncrystallized state in case that the solution temperature is 40° C. and the solution concentration is 60%, the aqueous solution of the lithium bromide is crystallized when the solution temperature decreases to 34° C. at the solution concentration of 64%.

Suppose that x is solution temperature (outside-air temperature) and y is solution concentration, the solution concentration in each characteristic $L_1$, $L_2$ and $L_3$ is represented as follows.

$$L_1: y = 0.3254X + 57.56 \tag{1}$$

$$L_2: y = -4 \times 10^{-5} X^3 + 0.0052 X^2 + 0.0141 X + 58.444 \tag{2}$$

$$L_3: y = -5 \times 10^{-6} X^3 + 0.0007 X^2 + 0.0439 X + 62.395 \tag{3}$$

In case that the aqueous solution of lithium bromide is used as the liquid absorbent 20, if the air conditioning unit is left in a state where the cooling operation stops, and if the outside-air temperature decreases, the liquid absorbent 20 is crystallized in each unit, leading to the problem that the air conditioning unit is put out of cooling operation for the next time. Such crystallization can be prevented by forcibly mixing the refrigerant 4 with the liquid absorbent 20 and thus diluting the liquid absorbent 20.

The cooling operation, the stopping operation and the operation under anomaly are respectively explained hereinafter.

The refrigerant 4 is supplied to the evaporator 2 by the refrigerant pump 8. Since the evaporator 2 is kept under vacuum state, the refrigerant 4 is evaporated when it drops therein and the heat exchange is performed owing to the latent heat. The air cooled by the heat exchange is supplied to the room by the room fan 12.

The refrigerant 4 supplied to the evaporator 2 is separated into liquid and vapor in the vapor-liquid separator 14 wherein the refrigerant 4 in the liquefied state is returned to the refrigerant tank 6. The refrigerant vapor 40 is introduced into the absorber 18 and is absorbed by the liquid absorbent 20 then it is stored in the liquid tank 26. The liquid absorbent 20a in the liquid tank 26 is supplied under pressure by the liquid pump 29 and passes through the circulation line 28 and the check valve 32 and introduced into the low temperature heat exchanger 30, and it is heated preliminarily by the liquid absorbent 20 supplied through the low temperature regenerative device 34, and thereafter it is introduced into the high temperature heat exchanger 36 and is also preliminarily heated by the liquid absorbent 20b supplied through the high temperature regenerative device 38. Such a heat exchange has also a purpose of transferring heat from the liquid absorbents 20 and 20b and thereby cooling them.

The liquid absorbent 20a heated in the high temperature heat exchanger 36 is more heated at high temperature in the high temperature regenerative device 38 so that the refrigerant 4 in the liquid absorbent 20a is evaporated and is separated into refrigerant vapor 40 and the dense liquid absorbent 20b. The refrigerant vapor 40 passes through the supply pipe 100 and is introduced into the low temperature regenerative device 34, and the refrigerant vapor 40 is converted into the refrigerant 4 in the low temperature regenerative device 34. The refrigerant vapor 40 and refrigerant 4 are introduced into the condenser 48 where they are concentrated, then surely liquefied. The refrigerant 4 in the condenser 48 is collected in the refrigerant tank 6.

The liquid absorbent 20b separated from the refrigerant 4 in the high temperature regenerative device 38 passes through the high temperature heat exchanger 36, low temperature regenerative device 34 and low temperature heat exchanger 30 and it is again introduced into the absorber 18 where it is used for absorbing the refrigerant 4.

Figure 12:
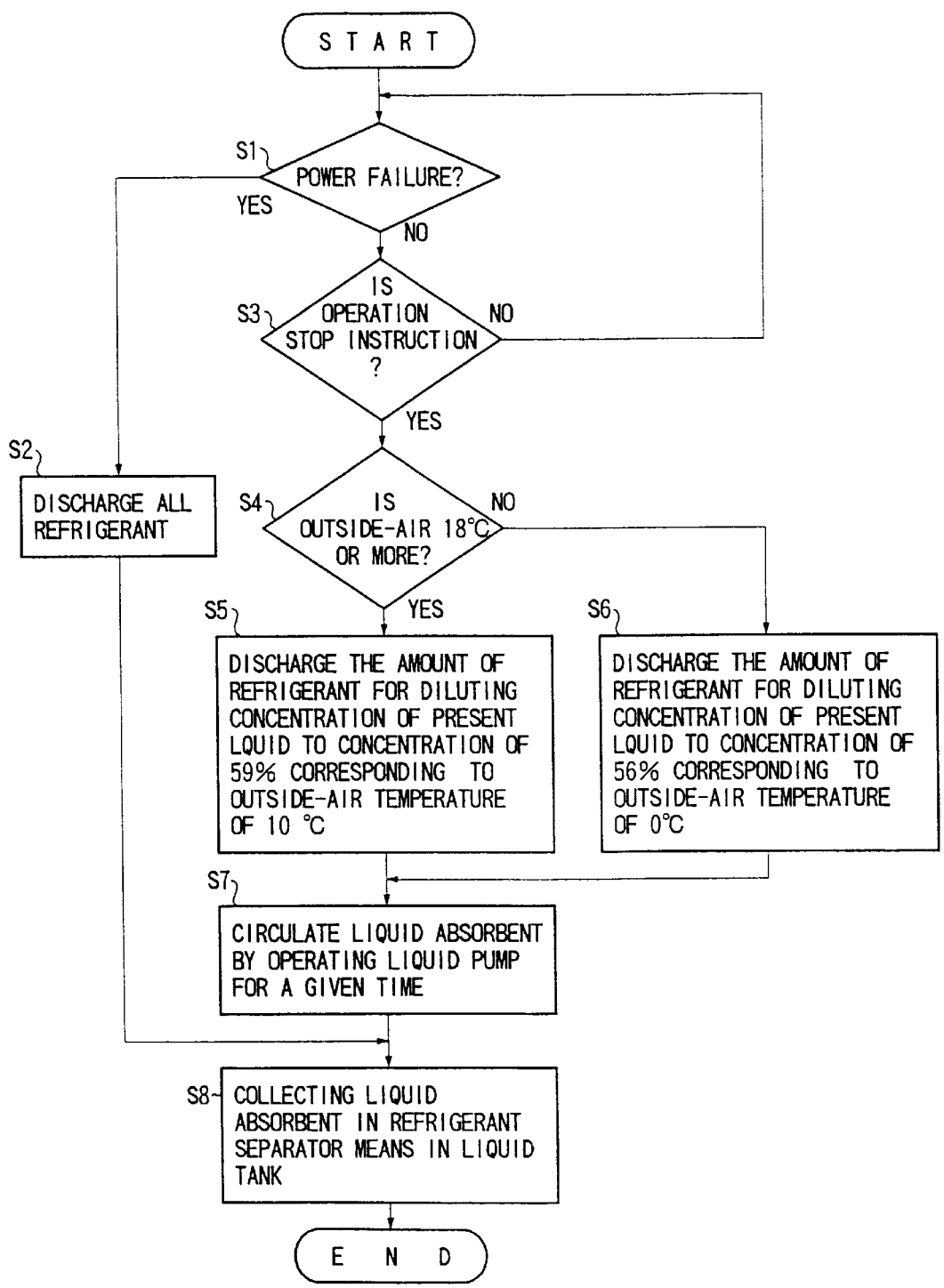
FIG. 12 is a flow chart showing a example of collecting control of the liquid absorbent.

The operation of the air conditioning unit in the failure of the power and when the air conditioning unit stops will be now described. FIG. 12 shows a collection control of the liquid absorbent in the case of power failure or when the air conditioning unit stops.

Figure 13:
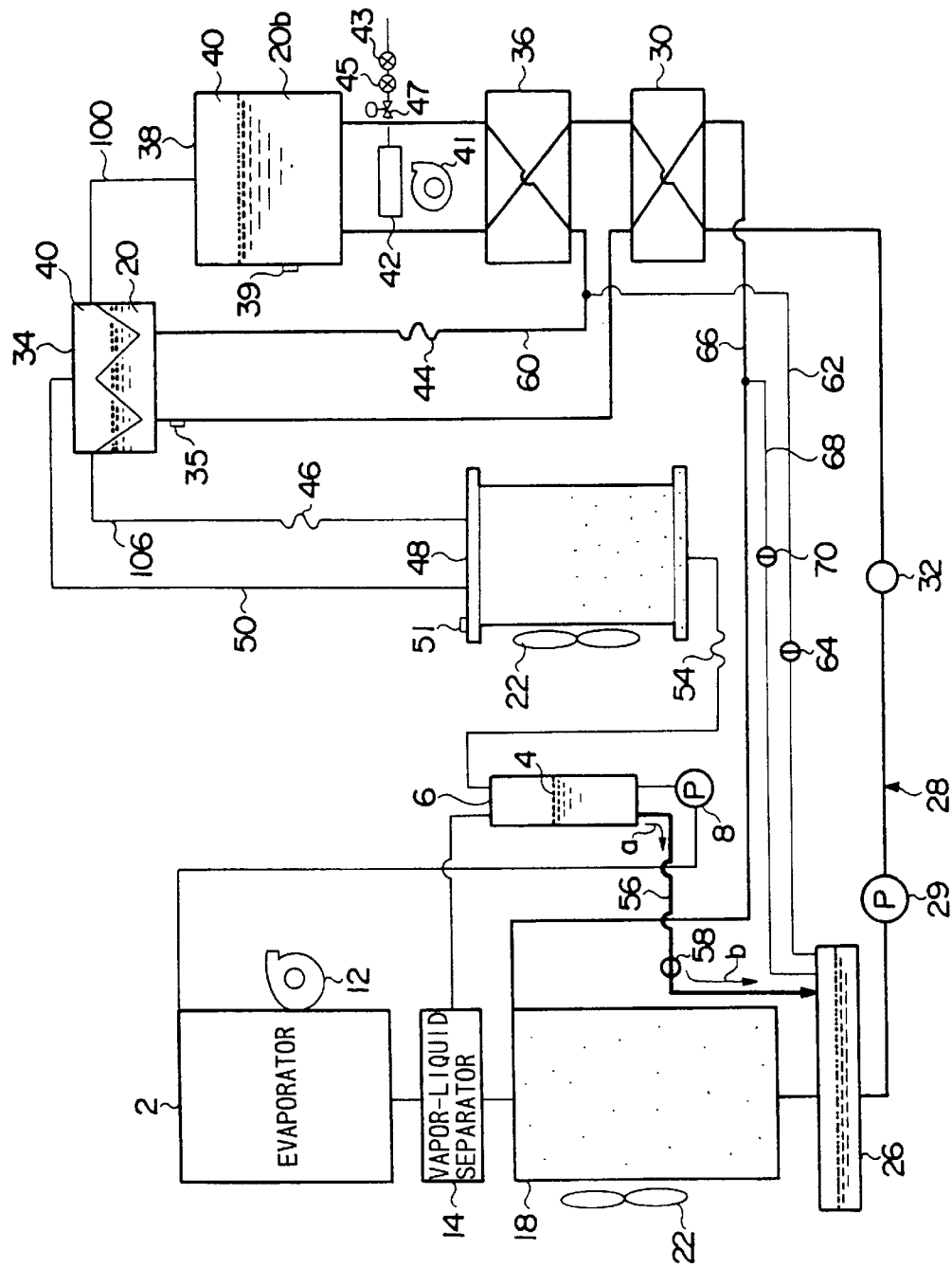
FIG. 13 is a block diagram showing a discharge mode of the refrigerant.
Figure 15:
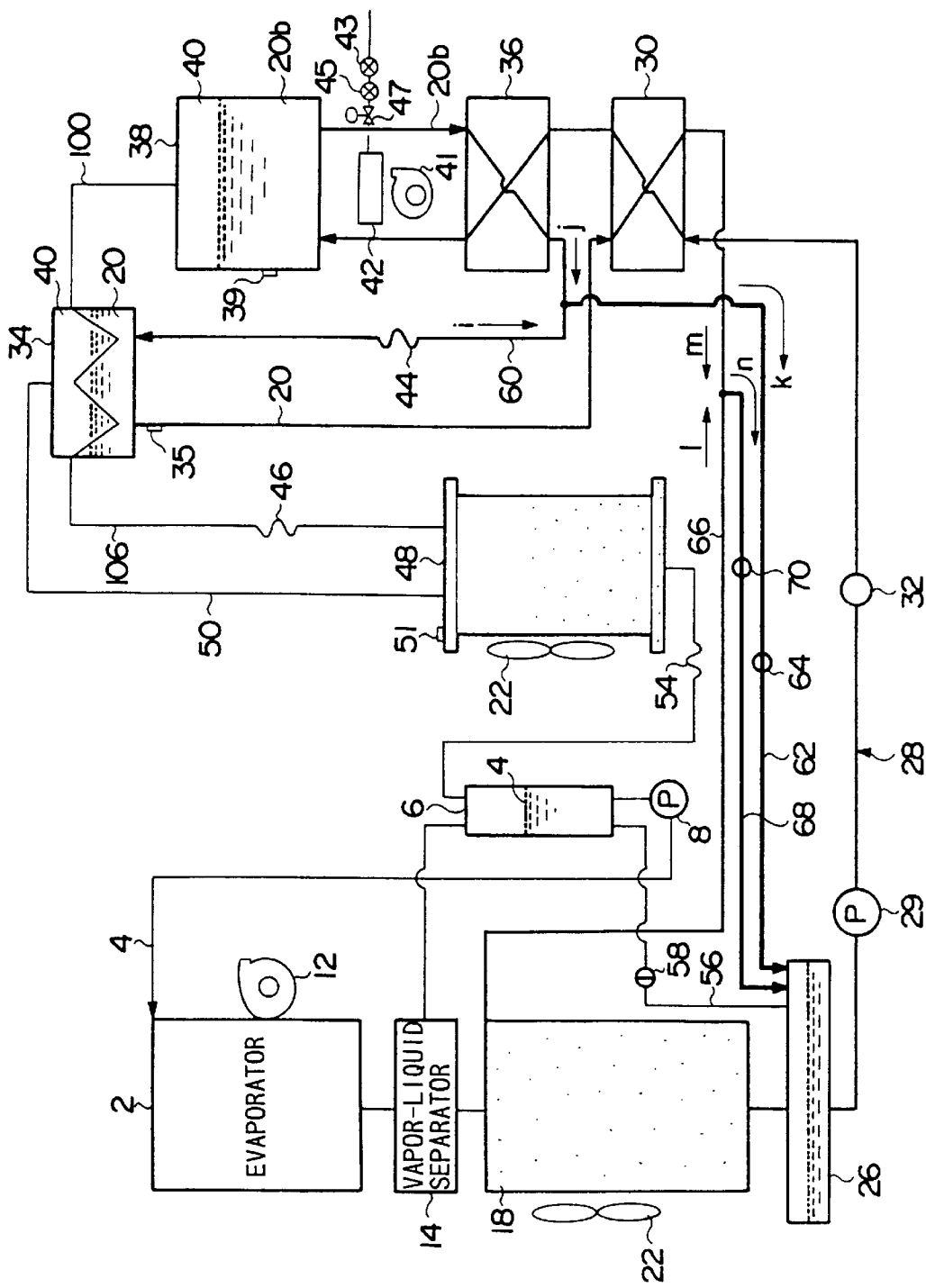
FIG. 15 is a block diagram showing a collection mode of the liquid absorbent.

In step S1, it is decided whether power failure occurs or not. In case of the power failure, the program goes to step S2 where the solenoid valve 58 is opened to supply all the refrigerant 4 to the liquid tank 26 and the solenoid valves 64 and 70 are opened so as to collect the liquid absorbent 20b into the liquid tank 26 from the refrigerant separation system. When the solenoid valves 58, 64 and 70 are used as normally opened type solenoid valves which are opened in the case of power failure, the lines 56, 62 and 68 can be kept opened in case of power failure. FIG. 13 shows the mode of discharge of the solution, wherein arrows a and b show the discharge routes of the refrigerant 4 and FIG. 15 shows a collection route of the liquid absorbent 20b.

If it is decided that there is no power failure, the program goes to step S3 and check whether an instruction of stopping operation has been issued or not. If it is confirmed that no instruction of stopping operation is issued, the program returns to step S1. If an instruction of stopping operation is issued, the program goes to step S4 and decides whether the outside-air temperature is lower than 18° C. or not. In the case that the outside-air temperature is not less than 18° C., the program goes to step S5 where the refrigerant 4 having the amount necessary for diluting the current solution concentration of the liquid absorbent 20a to that of 59% corresponding to the outside-air temperature of 10° C. is discharged through the refrigerant tank 6 to the liquid tank 26. FIG. 13 shows the mode of the discharge of the solution wherein arrows a and b show discharge route of the refrigerant 4.

In the case that the outside-air temperature is less than 18° C., the program goes to step S6 where the refrigerant 4 having the amount necessary for diluting the current solution concentration of the liquid absorbent 20a to that of 56% corresponding to the outside-air temperature of 0° C. is discharged through the refrigerant tank 6 to the liquid tank 26. FIG. 13 shows the mode of the discharge of the solution wherein arrows a and b show discharge route of the refrigerant 4.

Figure 14:
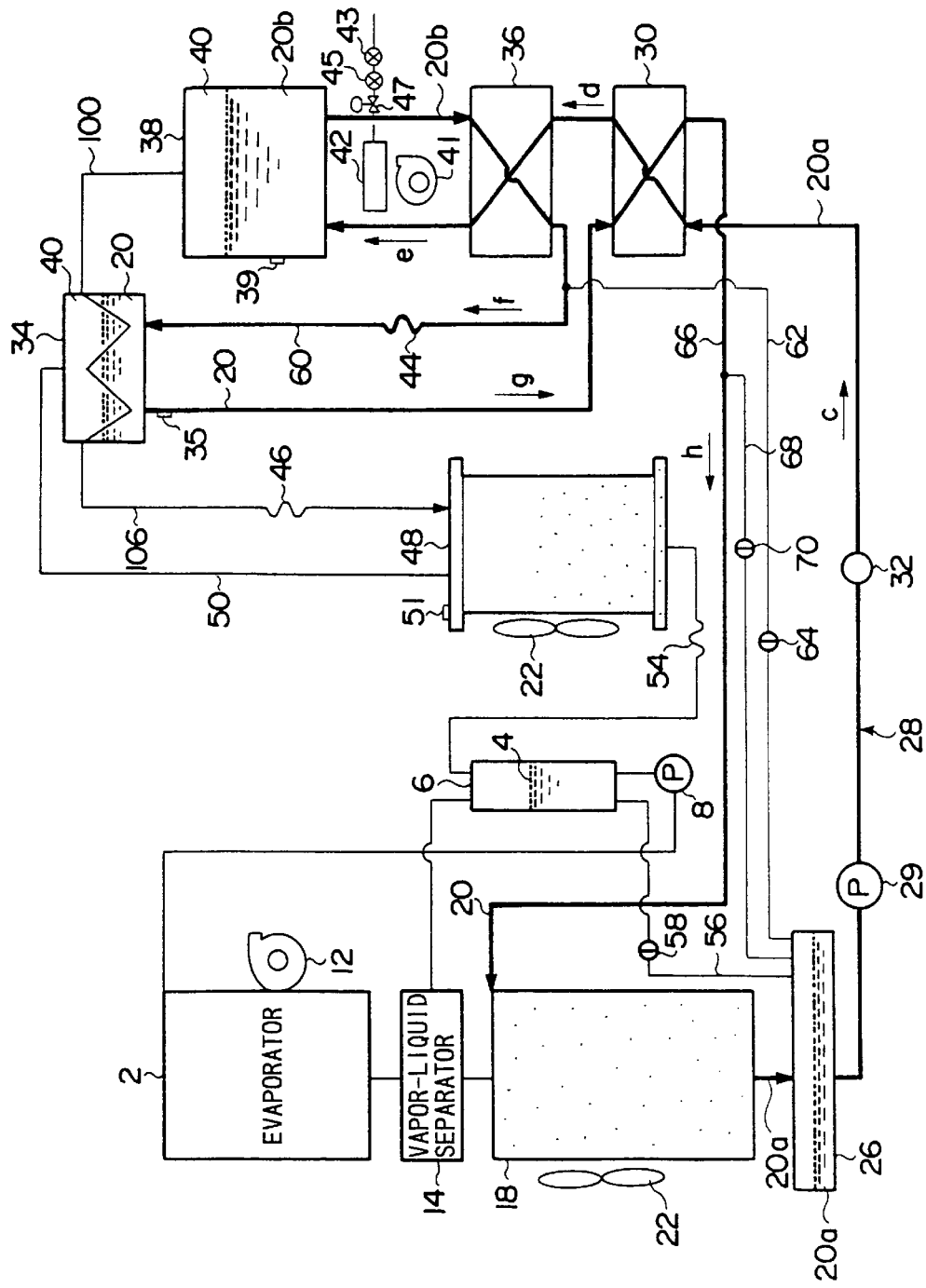
FIG. 14 is a block diagram showing a circulation mode of the liquid absorbent.

In step S7, the liquid pump 29 is in an operable state for a given time, so as to circulate the diluted liquid absorbent 20a through the circulation route extending from the circulation line 28, the low temperature heat exchanger 30, high temperature heat exchanger 36, the high temperature regenerative device 38, the high temperature heat exchanger 36, the low temperature regenerative device 34, the low temperature heat exchanger 30 and the absorber 18 to the liquid tank 26. FIG. 14 shows a liquid absorbent circulation mode wherein the arrows c, d, e, f, g and h show the circulation route.

In step S8, the liquid absorbent 20a at the side of the refrigerant separating means is collected in the liquid tank 26. FIG. 15 shows the liquid absorbent collection mode wherein the arrows i, j and k show the liquid absorbent collection routes through the line 62 and the arrows 1, m and n show the liquid absorbent collection routes through the line 68.

Figure 16:
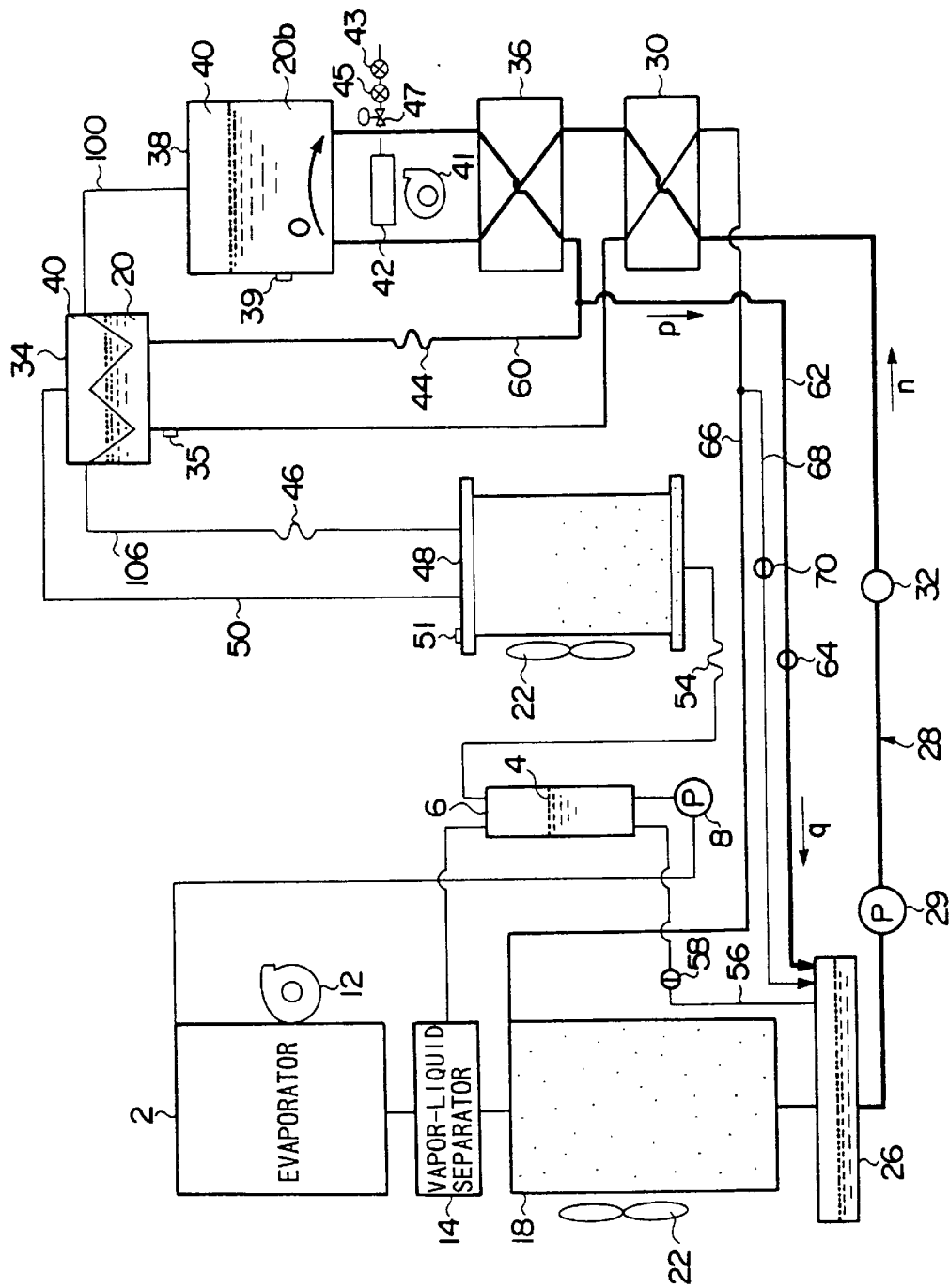
FIG. 16 is a block diagram showing a recirculation mode of the liquid absorbent.

FIG. 16 shows a liquid absorbent recirculation mode. This liquid absorbent recirculation mode is the one where the liquid absorbent 20b, which remains in the high temperature regenerative device 38 even if it passes through the liquid absorbent collection and the liquid absorbent circulation, is collected finally in the liquid tank 26. In this case, when the liquid pump 29 is driven to open the solenoid valve 64, the liquid absorbent 20a passes through the circulation route denoted by the arrows n, o, p and q and is circulated in the high temperature regenerative device 38, while the liquid absorbent 20b remaining in the high temperature regenerative device 38 is collected in the liquid tank 26. As a result, the collection of the liquid absorbent 20b remaining in the refrigerant separation system can be assured.

Next, FIG. 17 shows another example of the collection control of the liquid absorbent. In this collection control, it is decided whether the emergency stop is caused by anomaly after the decision of the presence of an operation stop instruction. In the case of the occurrence of anomaly, all the refrigerant 4 is supplied to the liquid tank 26 in the same manner as the power failure. Further, if the anomaly does not occur, the program goes to step S16 where control is the same as that in FIG. 12.

That is, in step S11, it is decided whether the power failure occurs or not, and the program goes to step S12 in the case of the power failure where the solenoid valve 58 is opened to supply all the refrigerant 4 to the liquid tank 26 and the solenoid valves 64 and 70 are opened to collect the liquid absorbent 20b from the refrigerant separation system into the liquid tank 26. If the power failure does not occur, the program goes to step S13 where it is confirmed whether operation stop instruction is issued or not. If the operation stop instruction is not issued, the program returns to step S11. If the operation stop instruction is issued, the program goes to step S14 where it is decided that the emergency stop is caused by anomaly or not. If the anomaly occurs, the program goes to step S15 where all the refrigerant 4 is supplied to the liquid tank 26 in the same manner as the power failure. If the emergency stop is not caused by anomaly in step S14, the program goes to step S16 where it is decided whether the outside-air temperature is lower than 18° C. or not. If the outside-air temperature is 18° C. or more, the program goes to step S17 where the refrigerant 4 having the amount necessary for diluting the current solution concentration of the liquid absorbent 20a to that of 59% corresponding to the outside-air temperature of 10° C. is discharged through the refrigerant tank 6 to the liquid tank 26.

If the outside-air temperature is less than 18° C., the program goes to step S18 where the refrigerant 4 having the amount necessary for diluting the current solution concentration of the liquid absorbent 20a to that of 56% corresponding to the outside-air temperature of 020 C. is discharged through the refrigerant tank 6 to the liquid tank 26.

In step S19, the liquid pump 29 is in an operable state for a given time so as to circulate the diluted liquid absorbent 20a through the circulation route extending from the circulation line 28, the low temperature heat exchanger 30, high temperature heat exchanger 36, the high temperature regenerative device 38, the high temperature heat exchanger 36, the low temperature regenerative device 34,. the low temperature heat exchanger 30 and the absorber 18 to the liquid tank 26, while the liquid absorbent 20a is collected in the liquid tank 26 in step S20.

In such a manner, in the case of stopping of the cooling operation, the refrigerant 4 in the refrigerant tank 6 is discharged into the liquid tank 26 to dilute the liquid absorbent 20a. That is, the liquid absorbent 20a diluted by the refrigerant 4 is supplied under pressure to the high temperature regenerative device 38, low temperature regenerative device 34, etc. by the liquid pump 29 so that the liquid absorbents 20, 20a and 20b remaining in the circulation route are diluted so as to prevent them from partly crystallizing owing to the sharp drop of the outside temperature.

If a large amount of the refrigerant is discharged into the liquid absorbent at one time, absorption heat is produced owing to the absorption reaction of the refrigerant in the liquid absorbent so that the refrigerant boils sharply. When the boiling of the refrigerant becomes calm, the liquid pump is operated so as to prevent air bubbles from entering the liquid pump, thereby preventing it from becoming inoperative. The diluted liquid absorbent is supplied under pressure by the liquid pump, so that liquid absorbent which is locally dense in concentration is diluted. The liquid pump waits to operate for the lapse of 1 to 3 minutes during which the boiling becomes calm after the refrigerant tank has discharged the maximum refrigerant holding amount of 1300 cc. However, this waiting time may be varied depending on the amount of discharge of the refrigerant.

Meanwhile, the diluting amount of the liquid absorbent, namely amount of refrigerant to be discharged into the collection tank is changed corresponding to the outside-air temperature when the air conditioning unit stops and the concentration of the liquid absorbent from which refrigerant is separated. That is, water in the refrigerant tank is discharged in response to the outside-air temperature when the air conditioning unit stops and also considering the expected variation of outside-air temperature. For example, if the outside-air temperature is 18° C. or more, the refrigerant is discharged aiming to the crystallization concentration of the lithium bromide of the 59% at the temperature of 10° C., supposing that the outside-air temperature will not drop lower to 10° C. If the outside-air temperature is less than 18° C., the refrigerant is discharged so that liquid absorbent is diluted to the extent of crystallization concentration of 56% corresponding to the temperature of 0° C. That is, 18° C. is usually considered as the temperature lower than which air cooling is unnecessary. If the temperature is above 18° C., outside-air temperature does not extremely lower.

The amount of discharge of refrigerant is calculated corresponding to the solution concentration, and dilution is performed by keeping the opening valve of the refrigerant tank opened during a time corresponding to this amount.

That is, suppose that X is solution concentration and that the outside-air temperature is 18° C. or more, the discharge amount is calculated as follows:

$$Q=(X\%-59\%)\times 100 \text{ cc} \tag{4}$$

If the outside-air temperature is less than 18° C. or more, the discharge amount is calculated as follows:

$$Q=(X\%-56\%)\times 100 \text{ cc} \tag{5}$$

The liquid absorbent is diluted with the refrigerant 4 by keeping the solenoid valve 58 opened during a time corresponding to the discharge amount Q.

The concentration of the dense liquid absorbent 20 (the liquid absorbent having the highest concentration from which the refrigerant 4 has been separated) is computed with the following expression, after detecting the condensation temperature of the refrigerant in the condenser and the temperature of the liquid absorbent 20 supplied to the absorber 18 from the low temperature regenerative device 34:

$$T_{SOL}=T_C(A_1\times X+A_2\times X^2+A_3\times X^3)+(B_1\times X+B_2\times X^2+B_3\times X^3) \tag{6}$$

In the expression (6),
$T_{SOL}$: solution temperature (°C.)
$T_C$: condensation temperature (°C.)
X: solution concentration (%)
$A_1,A_2,A_3,B_1,B_2,B_3$: coefficients Accordingly, the concentration of the liquid absorbent 20a to be supplied to the absorber 18 can be found by calculating the solution concentration X with the expression (6).

Meanwhile, the above operations would require a considerable length of time if they are conducted in real time in a CPU 132, which may possibly impede freedom of the other control operations.

Therefore a data table of relation between condensation temperature or solution temperature and solution concentration is prepared and stored in the ROM 134, and controls are performed reading out data based on the detected condensation temperature and solution temperature.

It is difficult to measure an accurate condensation temperature since the refrigerant vapor 40 reaching a temperature as high as 130° C. is introduced in the condenser 48 from the low temperature regenerative device 34, and also because of the presence of the refrigerant 4 cooled and condensed by the cooling fan 22. For this reason, the condensation temperature of the refrigerant in the condenser 48 is detected by the temperature sensor 51 fitted in the tip end portion of the temperature detecting pipe 120 which is provided in the upper header 112 to introduce and diffuse the refrigerant vapor 40 into the condenser 48. In such a manner, the refrigerant vapor 40 having high temperature which enters the inside of the temperature detecting pipe 120 can give off its heat while the entering amount of the refrigerant vapor 40 can be controlled, whereby a temperature approximating to the condensation temperature can be detected.

The amount of discharge of the refrigerant 4 from the refrigerant tank 6 to the liquid tank 26 is set so that the diluting amount should be as small as possible corresponding to the outside-air temperature and a part of the refrigerant 4 should remain in the refrigerant tank 6. That is, the interval or waiting time required to separate the refrigerant 4 from the liquid absorbents 20a and 20b at the time of restart of cooling operation and to supply the evaporator 2 with the refrigerant 4 can be reduced to a minimum or zero, by leaving a part of the refrigerant 4 in the refrigerant tank 6. As a result, cooling can be started in less time by supplying the refrigerant to the evaporator 2 at the same time as the start of operation of the air conditioning unit, as long as the refrigerant 4 remains in the refrigerant tank 6.

Decrease of concentration of the liquid absorbent 20 can be suppressed by controlling the diluting amount of the refrigerant 4 relative to the liquid absorbent 20a in response to the outside-air temperature, whereby the refrigerant 4 can be separated speedily at the time of restart of operation and the time needed for the absorption of the refrigerant vapor 40 by the liquid absorbent 20 can be shortened.

If a vital failure or breakdown such as anomaly in the room fan 12, overheating in the high temperature regenerative device 38 or low temperature regenerative device 34, break or short circuit in any of the temperature sensors 16, 35, 39, 51 or 53 is detected, the combustion of the gas burner 42 is stopped, all the refrigerant 4 in the refrigerant tank 6 is discharged to the liquid tank 26 to dilute the liquid absorbent 20a and thereafter the liquid pump 29 is driven so that the concentration of the liquid absorbent in each component should decrease. That is, the liquid absorbent is fluidized by diluting the liquid absorbents 20, 20a and 20b to the lowest possible concentration in order to prevent any unexpected accident, in response to the anomaly that has occurred.

After the refrigerant 4 is discharged into the liquid tank 26, the liquid pump 29 is driven to circulate the liquid absorbent 20a from the circulation line 28 to the refrigerant separation system to dilute the remaining liquid absorbents 20a and 20, and subsequently the solenoid valves 64 and 70 are opened to collect the liquid absorbent 20b remaining in the high temperature regenerative device 38 and low temperature regenerative device 34 into the liquid tank 26 where the liquid absorbent 20a is stirred with the refrigerant 4 to be diluted.

Thereafter, the liquid pump 29 is again driven to circulate the liquid absorbent 20a so that the liquid absorbent 20 remaining in the high temperature regenerative device 38 is diluted. At this time the solenoid valve 64 is kept opened, thereby collecting the liquid absorbent 20b in the liquid tank 26. After the liquid pump 29 is stopped, the solenoid valves 64 and 70 are kept in open state, thereby collecting the liquid absorbent 20b in the liquid tank 26.

In a case of unexpected stop in operation because of power failure, etc., since the solenoid valves 58, 64 and 70 employed are of a normal open type which is made open when the power source is cut off, the refrigerant 4, the liquid absorbents 20a and 20b are all collected in the liquid tank 26 for dilution when the electric current is cut off, thereby preventing crystallization of the liquid absorbents.

Also in a case of occurrence of anomaly, all the refrigerant 4 in the refrigerant tank 6 is discharged to the liquid tank 26 to dilute the liquid absorbents 20 and 20a, thereby preventing crystallization of the liquid absorbents 20, 20a and 20b.

Although the above embodiments have been explained for the case where water is used as the refrigerant 4 and lithium bromide is used as the liquid absorbent, the present invention can also be applied to a case where refrigerants other than water and liquid absorbents other than lithium bromide are employed. Namely, the present invention is not limited to any particular type of refrigerant or liquid absorbent.

As explained above, the present invention is expected to have the following effects.

a. When the air conditioning unit stops in operation, a given amount of refrigerant is supplied to the liquid tank corresponding to the outside-air temperature to dilute the liquid absorbent to a given concentration or lower, and the diluted liquid absorbent is circulated in the refrigerant separation means for cleansing the same. As a result, the liquid absorbent remaining inside the refrigerant separation means and the lines on the midway thereto is collected, thereby securing the prevention of crystallization of liquid absorbent caused by the decrease of the outside-air temperature to enhance the cooling operation. Since the liquid absorbent is diluted in advance in response to the outside-air temperature at the time of stop of operation, the lithium bromide solution can be prevented from crystallizing even in a season when the outside-air temperature changes sharply and in a wide range as autumn.

b. When the air conditioning unit stops in operation, the amount of refrigerant to dilute the liquid absorbent in the liquid tank is controlled so as to change the concentration of the liquid absorbent to a level where it does not crystallize, whereby the liquid absorbent in the liquid tank is prevented from crystallizing and the effect of cleansing the refrigerant separation means is enhanced. Since the amount of discharge of refrigerant is decided corresponding to the concentration of the liquid absorbent, it is possible to leave a part of the refrigerant in the refrigerant tank, whereby the refrigerant can be supplied to the evaporator at the same time as the operation of the air conditioning unit starts for the next time.

c. Since collecting lines are provided between the line of the refrigerant separation means and the liquid tank to return the liquid absorbent to the liquid tank, the liquid absorbent which cleansed the refrigerant separation means is quickly returned to the liquid tank, thereby enhancing the efficiency of collection of the remaining liquid absorbent.

d. Since the concentration of the liquid absorbent is computed with reference to the condensation temperature of the condenser and the solution temperature of the low temperature regenerative device, it is possible to optimize the dilution of the liquid absorbent, thereby preventing the refrigerant from being excessively discharged.

e. Since a pump is provided in a line introducing the liquid absorbent stored in the liquid tank to the refrigerant separation means, the liquid absorbent as the cleansing liquid can be supplied under pressure, thereby quickly cleansing the lines and refrigerant separation means.

f. Since a check valve is provided in the line introducing the liquid absorbent stored in the liquid tank to the refrigerant separation means, it is possible to securely prevent the liquid absorbent from flowing back to the liquid tank owing to the pressure distribution between the liquid tank and the refrigerant separation means.

While the structures, functions and effects of the present invention in its embodiments have been described above, the present invention is not limited to the above embodiments, but it covers any structures including modifications thereof that a person skilled in the art can anticipate from the object and embodiments of the invention.

What is claimed is:

1. An air conditioning unit comprising:

a refrigerant tank for storing refrigerant therein;

evaporation means for evaporating the refrigerant supplied from the refrigerant tank under low pressure and for removing latent heat from air to cool the air;

refrigerant collection means for absorbing evaporated refrigerant by liquid absorbent;

a liquid tank for storing the liquid absorbent and evaporated refrigerant absorbed therein, which is introduced from the refrigerant collection means;

refrigerant separation means for introducing the liquid absorbed from the liquid tank and separating the refrigerant from the liquid absorbent;

diluting means for supplying the refrigerant from the refrigerant tank to the liquid tank, thereby diluting the liquid absorbent;

collection lines for forcing the liquid absorbent diluted by the diluting means to flow into the refrigerant separation means and returning the liquid absorbent remaining in the refrigerant separation means to the liquid tank; and control means for stopping the operation of the refrigerant separation means when the operation of the air conditioning unit stops, supplying a given amount of refrigerant from the refrigerant tank to the liquid tank corresponding to an outside-air temperature when the refrigerant separation means stops, thereby decreasing concentration of liquid absorbent in the liquid tank to a given value or less, and circulating the liquid absorbent of decreased concentration from the liquid tank to the refrigerant separation means and therefore returning it to the liquid tank.

2. The air conditioning unit according to claim 1, wherein the control means computes the amount of supply of the refrigerant, which flows from the refrigerant tank to the liquid tank when the air conditioning unit stops in operation, and reaches a given diluting concentration in response to the concentration of the liquid absorbent when the air conditioning unit stops in operation.

3. The air conditioning unit according to claim 2, wherein collecting lines are provided between the line of the refrigerant separation means and the liquid tank wherein the liquid absorbent is returned to the liquid tank through the collecting lines when the air conditioning unit stops in operation.

4. An air conditioning unit comprising:

a refrigerant tank for storing refrigerant therein;

evaporation means for evaporating the refrigerant supplied form the refrigerant tank under low pressure and for removing latent heat from air to cool the air;

refrigerant collection means for absorbing evaporated refrigerant by liquid absorbent;

a liquid tank for storing the liquid absorbent and evaporated refrigerant absorbed therein, which is introduced from the refrigerant collection means;

refrigerant separation means for introducing the liquid absorbed from the liquid tank and separating the refrigerant from the liquid absorbent;

diluting means for supplying the refrigerant from the refrigerant tank to the liquid tank, thereby diluting the liquid absorbent;

collection lines for forcing the liquid absorbent diluted by the diluting means to flow into the refrigerant separation means and returning the liquid absorbent remaining in the refrigerant separation means to the liquid tank; and control means for stopping the operation of the refrigerant separation means when the operation of the air conditioning unit stops supplying a given amount of refrigerant from the refrigerant tank to the liquid tank corresponding to an outside-air temperature when the refrigerant separation means stops, thereby decreasing concentration of liquid absorbent in the liquid tank to a given value or less, and circulating the liquid absorbent of decreased concentration from the liquid tank to the refrigerant separation means and therefore returning it to the liquid tank;

wherein the refrigerant separation means comprises a low temperature regenerative device for regenerating the refrigerant vapor from the vapor collected from the liquid absorbent, and a condenser for condensing the refrigerant vapor which is generated in the low temperature regenerative device, wherein the concentration of the liquid absorbent to flow from the refrigerant tank to the collection tank when the operation of the air conditioning unit stops is computed with reference to the condensation temperature of the condenser and the solution temperature of the low temperature regenerative device.

5. The air conditioning unit according to claim 1, wherein a pump is provided in a line introducing the liquid absorbent stored in the liquid tank to the refrigerant separation means.

6. An air conditioning unit comprising:

a refrigerant tank for storing refrigerant therein;

evaporation means for evaporating the refrigerant supplied form the refrigerant tank under low pressure and for removing latent heat from air to cool the air;

refrigerant collection means for absorbing evaporated refrigerant by liquid absorbent;

a liquid tank for storing the liquid absorbent and evaporated refrigerant absorbed therein, which is introduced from the refrigerant collection means;

refrigerant separation means for introducing the liquid absorbed from the liquid tank and separating the refrigerant from the liquid absorbent;

diluting means for supplying the refrigerant from the refrigerant tank to the liquid tank, thereby diluting the liquid absorbent;

collection lines for forcing the liquid absorbent diluted by the diluting means to flow into the refrigerant separation means and returning the liquid absorbent remaining in the refrigerant separation means to the liquid tank; and control means for stopping the operation of the refrigerant separation means when the operation of the air conditioning unit stops, supplying a given amount of refrigerant from the refrigerant tank to the liquid tank corresponding to an outside-air temperature when the refrigerant separation means stops, thereby decreasing concentration of liquid absorbent in the liquid tank to a given value or less, and circulating the liquid absorbent of decreased concentration from the liquid tank to the refrigerant separation means and therefore returning it to the liquid tank;

wherein a check valve is provided in the line introducing the liquid absorbent stored in the liquid tank to the refrigerant separation means.

7. An air conditioning method comprising the steps:

storing liquid refrigerant;

evaporating a portion of the refrigerant and thereby removing latent heat from ambient air;

subjecting evaporated refrigerant to a liquid absorbent which absorbs evaporated refrigerant;

storing the liquid absorbent having absorbed refrigerant;

separating the refrigerant from the liquid absorbent;

adding stored liquid refrigerant to the stored absorbent for maintaining absorbent at a diluted level;

circulating the diluted absorbent;

detecting stoppage of air conditioning operation followed by the resulting steps
 a) terminating separation of refrigerant from liquid absorbent; and
 b) supplying a preselected quantity of stored refrigerant to the stored absorbent thereby further decreasing the concentration of stored liquid absorbent; and circulating the liquid absorbent of decreased concentration to prevent crystallization thereof.

8. The method set forth in claim 7 together with the step of computing the flow of refrigerant that supplies the preselected quantity in response to the concentration of the liquid absorbent when operation is stopped.

9. The method of claim 8 together with the step of returning liquid absorbent for storage, when operation is stopped.

10. The method of claim 7 wherein the refrigerant separation comprises the steps of:

regenerating the refrigerant vapor at low temperature from vapor collected from liquid absorbent;

condensing refrigerant vapor in a low pressure environment; wherein concentration of the liquid absorbent is computed with reference to the temperature of a condenser and solution temperature during low temperature regeneration.

* * * * *